US008019120B2

(12) United States Patent
Murata et al.

(10) Patent No.: US 8,019,120 B2
(45) Date of Patent: Sep. 13, 2011

(54) IMAGE PROCESSING APPARATUS, IMAGE PROCESSING METHOD, IMAGE PROCESSING PROGRAM, RECORDING MEDIUM RECORDING THE IMAGE PROCESSING PROGRAM, AND MOVING OBJECT DETECTION SYSTEM

(75) Inventors: Yoshiro Murata, Nara (JP); Daisuke Mitsumoto, Nagaokakyo (JP); Hiroyoshi Koitabashi, Nara (JP); Yoshinobu Asokawa, Nara (JP)

(73) Assignee: Omron Corporation, Kyoto (JP)

( * ) Notice: Subject to any disclaimer, the term of this patent is extended or adjusted under 35 U.S.C. 154(b) by 1175 days.

(21) Appl. No.: 11/740,058

(22) Filed: Apr. 25, 2007

(65) Prior Publication Data
US 2007/0253596 A1 Nov. 1, 2007

(30) Foreign Application Priority Data

Apr. 26, 2006 (JP) ................................ 2006-122570

(51) Int. Cl.
*G06K 9/00* (2006.01)
(52) U.S. Cl. ........................................................ 382/103
(58) Field of Classification Search .................. 382/103, 382/107, 190, 195, 201, 209, 219; 348/154, 348/155, 169, 171, 172
See application file for complete search history.

(56) References Cited

U.S. PATENT DOCUMENTS

| 5,278,663 A | * | 1/1994 | Hong | 386/21 |
| 5,554,983 A | | 9/1996 | Kitamura et al. | |
| 5,732,146 A | * | 3/1998 | Yamada et al. | 382/107 |
| 5,757,287 A | | 5/1998 | Kitamura et al. | |
| 5,802,220 A | * | 9/1998 | Black et al. | 382/276 |
| 5,844,613 A | * | 12/1998 | Chaddha | 375/240.12 |
| 6,028,960 A | * | 2/2000 | Graf et al. | 382/203 |
| 6,249,612 B1 | * | 6/2001 | Ogura | 382/236 |
| 6,295,367 B1 | * | 9/2001 | Crabtree et al. | 382/103 |
| 6,335,985 B1 | * | 1/2002 | Sambonsugi et al. | 382/190 |
| 6,404,901 B1 | * | 6/2002 | Itokawa | 382/103 |
| 6,678,330 B1 | * | 1/2004 | Kondo et al. | 375/240.24 |
| 7,362,887 B2 | * | 4/2008 | Oohashi et al. | 382/118 |
| 7,646,891 B2 | * | 1/2010 | Kage et al. | 382/107 |

(Continued)

FOREIGN PATENT DOCUMENTS

JP 5-298591 11/1993

(Continued)

*Primary Examiner* — Jason M Repko
*Assistant Examiner* — Shervin Nakhjavan
(74) *Attorney, Agent, or Firm* — Foley & Lardner LLP

(57) ABSTRACT

It is intended to provide an image processing apparatus enabling an image processing for association of a standard image to a reference image using a reduced number of pixels without deteriorating accuracy for detecting a movement of a detection subject. A detection subject region setting unit obtains a picked-up image at a first time point as a standard image from time-series picked-up image data obtained by an image pickup unit and selects a plurality of correlation windows including an image region of the detection subject in the standard image with relative positions with respect to the standard point being identified. A movement detection unit obtains a picked-up image at a second time point that is different from the first time point as a reference image and detects a movement of the detection subject between the standard image and the reference image by calculating in the reference image a position of the standard point that minimizes a difference between a state of pixel values of the correlation windows of the standard image and a state of pixel values of correlation windows of the reference image.

15 Claims, 21 Drawing Sheets

U.S. PATENT DOCUMENTS

| | | | |
|---|---|---|---|
| 2002/0057383 A1* | 5/2002 | Iwamura | 348/734 |
| 2002/0167533 A1* | 11/2002 | Tirumalai et al. | 345/629 |
| 2004/0120548 A1* | 6/2004 | Qian | 382/103 |
| 2004/0146183 A1* | 7/2004 | Shimoni | 382/103 |
| 2005/0012023 A1* | 1/2005 | Vock et al. | 250/206.1 |
| 2005/0089100 A1* | 4/2005 | Arita et al. | 375/240.16 |
| 2005/0100095 A1* | 5/2005 | Itoh et al. | 375/240.16 |
| 2005/0259739 A1* | 11/2005 | Nakamura et al. | 375/240.16 |
| 2006/0083407 A1* | 4/2006 | Zimmermann et al. | 382/107 |

FOREIGN PATENT DOCUMENTS

JP        2000-276596        10/2000

* cited by examiner

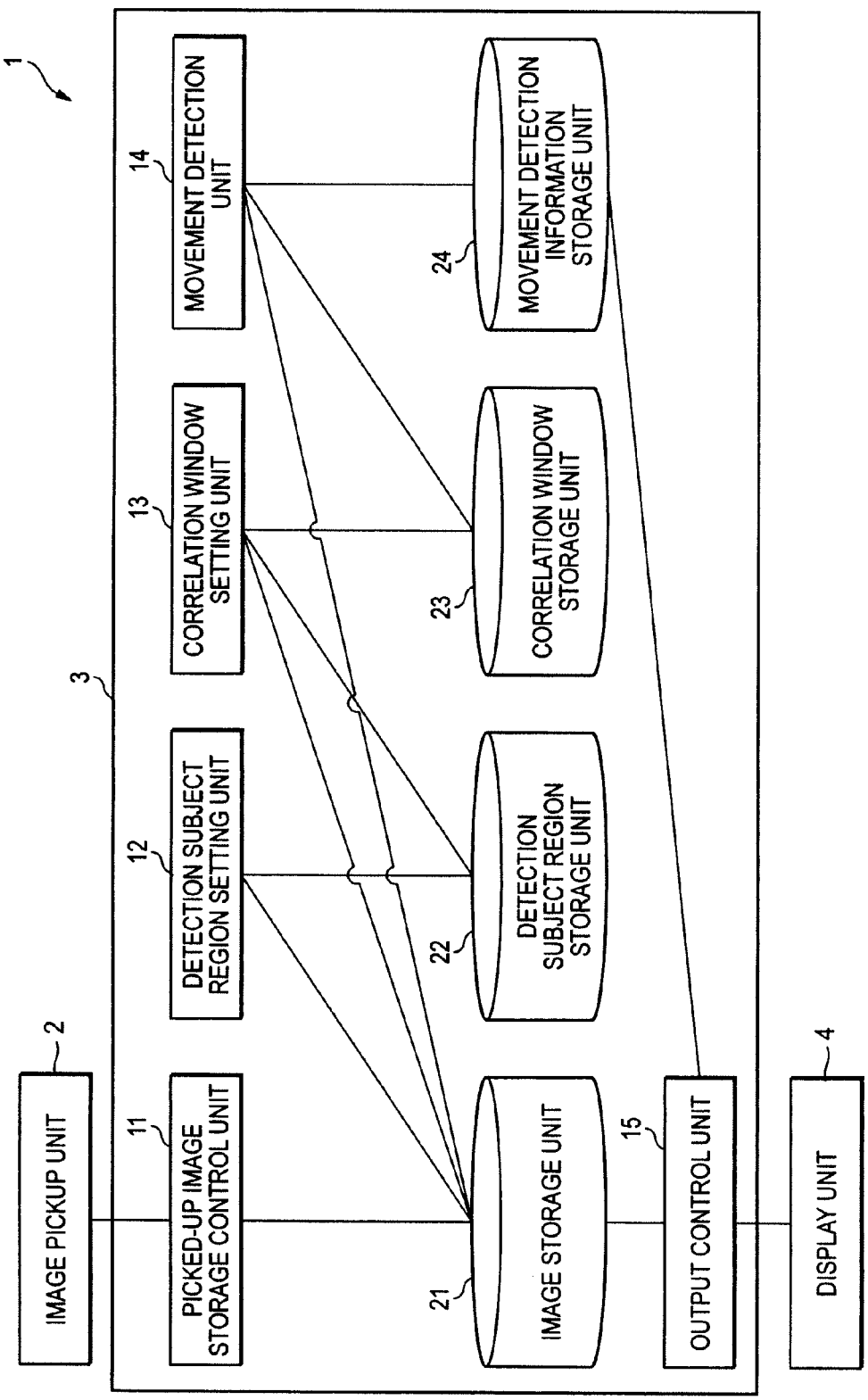

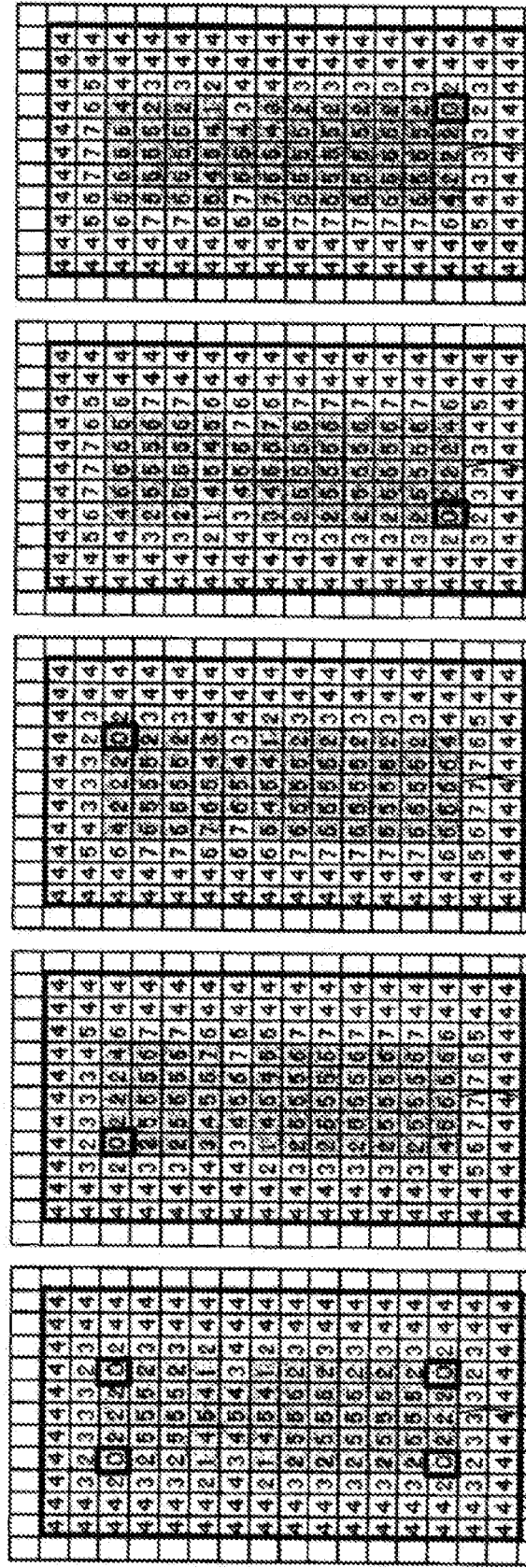

FIG. 13A
FIG. 13B
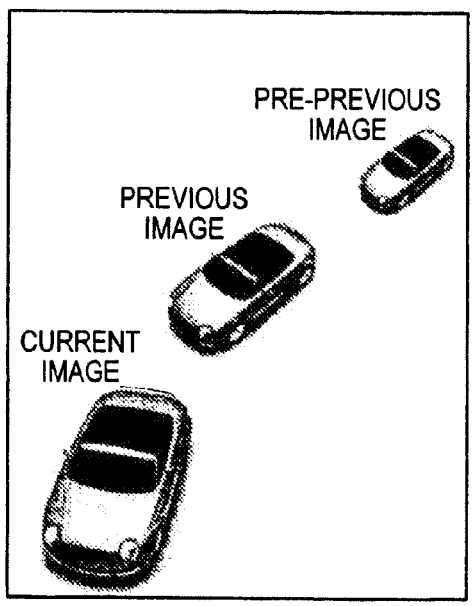
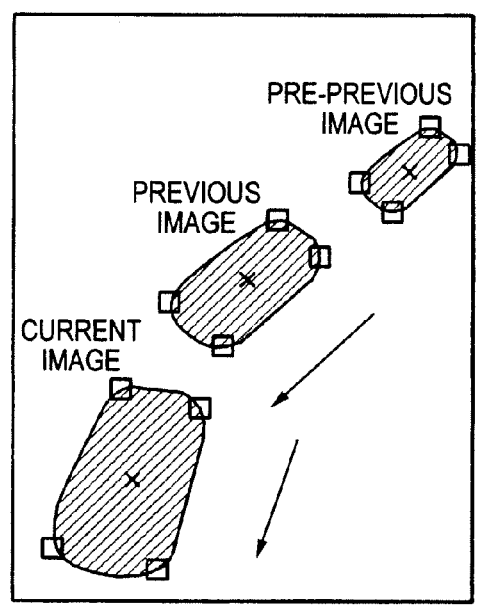

IMAGE PROCESSING APPARATUS, IMAGE PROCESSING METHOD, IMAGE PROCESSING PROGRAM, RECORDING MEDIUM RECORDING THE IMAGE PROCESSING PROGRAM, AND MOVING OBJECT DETECTION SYSTEM

This application claims priority from Japanese patent application 122570/2006, filed on Apr. 26, 2006. The entire contents of the aforementioned application is incorporated herein by reference.

TECHNICAL FIELD

This invention relates to an image processing apparatus for detecting movement of a detection subject such as a person or an object, an image processing method, an image processing program, and a recording medium recording the image processing program.

BACKGROUND ART

Moving object tracking systems that pick up a movement of a tracking subject such as a person or an object as a moving image using a surveillance camera and determine a movement of the picked up person or object by analyzing the moving image have heretofore been provided. The moving object tracking system is usable for traffic control, vehicle travel assistance, and the like by determining movements of vehicles, for example. Also, the moving object tracking system is usable for passersby status investigation, customer behavior investigation, and the like by determining movements of passersby in public areas and movements of customers and the like in retail premises. Also, the moving object tracking system is usable for production control, production planning, and the like by determining movements of production subjects in a production line in a plant and movements of workers.

Such moving object tracking system is provided with an image processing apparatus for performing an image processing on picked-up images which have been picked up by the surveillance camera. Such image processing apparatus detects movements of a detection subject by performing a processing of associating the detection subject in a current image (reference image) to the detection subject in a past image (reference image) as an identical object.

In the association processing, a region including an entire image region of the detection subject is set as a correlation window based on the reference image. By performing a search in the reference image with the use of the correlation window, a position of the correlation window at which a difference between pixel values in the correlation window in the standard image and pixel values in the correlation window in the reference image is minimized is determined as a position of the detection subject in the reference image.

[Patent Publication] JP-A-2003-346159 (published on Dec. 5, 2003).

SUMMARY OF THE INVENTION

In the case of performing the detection subject movement detection processing on real-time bases, it is necessary to reduce a processing time. In the case where a speed of the movement of the detection subject is high, it is necessary to increase the number of frames per unit time in a moving image, and spacing between frames is shortened to make it necessary to complete the association in the short inter-frame spacing. On the other hand, when the inter-frame spacing for performing the movement detection processing is increased for the purpose of ensuring the processing time, a movement distance of the detection subject during the spacing is increased, thereby increasing a risk of failing to detect a movement depending on a speed of the detection subject. Accordingly, the time required for the movement detection processing is further increased.

As described above, the movement detection processing is performed by using information of values of pixels included in the correlation window. Therefore, the processing time is increased with an increase in number of pixels included in the correlation window.

In general, the correlation window is so set as to include an entire part of the detection subject (for example, an entire part of a person). In such case, the number of pixels included in the correlation window is increased to result in an increase in processing time.

Patent Publication 1 discloses a technology for stably detecting a movement of a person by setting a part of the person such as a head and a trunk of the person as a tracking subject. In this case, though the processing time is reduced as compared to the case of setting an entire part of the person as the tracking subject, the number of pixels is still large, and the technology is not so practical from the stand point of the real-time processing.

This invention was accomplished in view of the above-described problems, and an object thereof is to provide an image processing apparatus, an image processing method, an image processing program, and a recording medium recording the image processing program, which enable to perform an image processing on a reduced number of pixels for associating a standard image to a reference image without deteriorating accuracy for detecting a movement of a detection subject.

In order to solve the above-described problems, an image processing apparatus according to this invention has a structure of comprising a partial image region setting unit for obtaining a picked-up image at a first time point as a standard image from time-series picked-up image data obtained by an image pickup unit picking up a detection subject and selecting a plurality of partial image regions including an image region of the detection subject in the standard image and a movement detection unit for obtaining a picked-up image at a second time point that is different from the first time point as a reference image and detecting a movement of the detection subject between the standard image and the reference image based on a difference between a state of pixel values of the partial image regions of the standard image and a state of pixel values of partial image regions of the reference image, wherein the partial image region setting unit sets a standard point used as a standard for relative positions of the partial image regions; and the movement detection unit obtains the state of the pixel values of the partial image regions of the reference image with the relative positions of the partial image regions with respect to the standard point being unchanged and calculates the difference between the obtained state of the pixel values of the partial image regions and the state of the pixel values of the partial image regions of the standard image.

Also, in order to solve the above-described problems, an image processing method according to this invention comprises a partial image region setting step for obtaining a picked-up image at a first time point as a standard image from time-series picked-up image data obtained by an image pickup unit picking up a detection subject and selecting a plurality of partial image regions including an image region of the detection subject in the standard image and a movement detection step for obtaining a picked-up image at a second time point that is different from the first time point as a reference image and detecting a movement of the detection subject between the standard image and the reference image based on a difference between a state of pixel values of the partial image regions of the standard image and a state of pixel values of partial image regions of the reference image, wherein a standard point used as a standard for relative positions of the partial image regions is set in the partial image region setting step; and the state of the pixel values of the partial image regions of the reference image are obtained with the relative positions of the partial image regions with respect to the standard point being unchanged to calculate the difference between the obtained state of the pixel values of the partial image regions and the state of the pixel values of the partial image regions of the standard image in the movement detection step.

According to the above-described structure and method, the partial image regions including the image region of the detection subject in the standard image are selected at plural positions. After that, the state of the pixel values in the plural partial image regions of the standard image is compared with that of the reference image, and a movement of the detection subject between the standard image and the reference image is detected based on the thus-detected difference.

Since the partial image regions are set at the plural positions on the detection subject, it is possible to accurately determine characteristics of a shape of the detection subject when the numbers of pixels included in the partial image regions are reduced. Accordingly, as compared to the method of detecting a movement of a detection subject by associating an image region including an entire image region of the detection subject of a standard image to that of a reference image, it is possible to perform the image processing on a reduced number of pixels for associating the standard image to the reference image. Therefore, it is possible to provide the image processing apparatus realizing the detection of the movement of the detection subject in a reduced processing time.

Also, according to the above-described structure, the state of the pixel values in the partial image regions of the reference image is obtained with the relative positions of the partial image regions with respect to the standard point being unchanged. That is, it is possible to associate the detection subject in the standard image to that in the reference image with the positional relationship between the plural positions characterizing the shape of the detection subject being considered. Therefore, it is possible to accurately perform the movement detection of the detection subject in the case where the shapes of the detection subjects in the standard image and the reference image differ little from each other.

In order to solve the above-described problems, an image processing apparatus according to this invention has a structure of comprising a partial image region setting unit for obtaining a picked-up image at a first time point as a standard image from time-series picked-up image data obtained by an image pickup unit picking up a detection subject and selecting a plurality of partial image regions including an image region of the detection subject in the standard image and a movement detection unit for obtaining a picked-up image at a second time point that is different from the first time point as a reference image and detecting a movement of the detection subject between the standard image and the reference image based on a difference between a state of pixel values of the partial image regions of the standard image and a state of pixel values of partial image regions of the reference image, wherein the partial image region setting unit sets a standard point used as a standard for relative positions of the partial image regions; and the movement detection unit obtains the state of the pixel values of the partial image regions of the reference image by converting the relative positions of the partial image regions with respect to the standard point by a predetermined conversion processing and calculates a position of the standard point in the reference image by calculating the difference between the obtained state of the pixel values of the partial image regions and the state of the pixel values of the partial image regions of the standard image.

Also, in order to solve the above-described problems, an image processing method according to this invention comprises a partial image region setting step for obtaining a picked-up image at a first time point as a standard image from time-series picked-up image data obtained by an image pickup unit picking up a detection subject and selecting a plurality of partial image regions including an image region of the detection subject in the standard image and a movement detection step for obtaining a picked-up image at a second time point that is different from the first time point as a reference image and detecting a movement of the detection subject between the standard image and the reference image based on a difference between a state of pixel values of the partial image regions of the standard image and a state of pixel values of partial image regions of the reference image, wherein a standard point used as a standard for relative positions of the partial image regions is set in the partial image region setting step; and the state of the pixel values of the partial image regions of the reference image by converting the relative positions of the partial image regions with respect to the standard point by a predetermined conversion processing is obtained to calculate a position of the standard point in the reference image by calculating the difference between the obtained state of the pixel values of the partial image regions and the state of the pixel values of the partial image regions of the standard image in the movement detection step.

According to the above-described structure and method, the partial image regions including the image region of the detection subject in the standard image are selected at plural positions. After that, the state of the pixel values in the plural partial image regions of the standard image is compared with that of the reference image, and a movement of the detection subject between the standard image and the reference image is detected based on the thus-detected difference.

Since the partial image regions are set at the plural positions for the detection subject, it is possible to accurately determine characteristics of a shape of the detection subject when the numbers of pixels included in the partial image regions are reduced. Accordingly, as compared to the method of detecting a movement of a detection subject by associating an image region including an entire image region of the detection subject of a standard image to that of a reference image, it is possible to perform the image processing on the reduced number of pixels for associating the standard image to the reference image without deteriorating an accuracy for detecting the movement of the detection subject. Therefore, it is possible to provide the image processing apparatus realizing the detection of the movement of the detection subject in a reduced processing time.

Also, according to the above structure or the method, the relative positions of the partial image regions with respect to the standard point are converted by the predetermined conversion processing when obtaining the state of the pixel values in the partial image regions of the reference image. Therefore, it is possible to accurately associate the detection subjects of the standard image and the reference image to each other in the case where a size or an orientation of the image of the detection subject of the standard image is different from that of the reference image.

Also, in the above-described structure, the image processing apparatus according to this invention may have a structure that a total of numbers of pixels in the plural partial image regions is smaller than the number of pixels of the image region of the detection subject. With such structure, it is possible to more reliably realize the reduction in processing time.

Also, in the above-described structure, the image processing apparatus according to this invention may have a structure that the partial image region setting unit divides the image region of the detection subject into a plurality of intermediate regions to select at least one of the intermediate regions as the partial image region. With such structure, it is possible to perform the association based on the entire shape of the detection subject by selecting the partial image regions evenly from the intermediate regions.

Also, in the above-described structure, the image processing apparatus according to this invention may have a structure that the partial image region setting unit selects a plurality of characteristic points by applying a filter for detecting the characteristic points characterizing a partial shape of the detection subject to the standard image to set a region including the characteristic points as the partial image region.

According to the above-described structure, the characteristic points are selected by applying the filter to the standard image. Since the size required for detecting the characteristic points characterizing partial shapes of the detection subject is sufficient as the size of this filer, the filter has a relatively small size. Therefore, the processing time required for detecting the characteristic points becomes relatively short. Specifically, examples of the filter for detecting the characteristic points characterizing the partial shape of the detection subject are a primitive filter such as those used for detecting a horizontal edge and an angle edge. Since the size of such filters is relatively small, it is possible to rapidly perform the characteristic point detection.

Also, in the above-described structure, the image processing apparatus according to this invention may have a structure that the movement detection unit performs a processing of enlarging or reducing a distance between each of the relative positions of the partial image regions and the standard point as the predetermined conversion processing.

According to the above-described structure, in the case where the size of the image of the detection subject in the standard image differs from that of the reference image, it is possible to accurately perform the association in response to the change.

Also, in the above-described structure, the image processing apparatus according to this invention may have a structure that the movement detection unit decides an enlargement/reduction ratio based on a position of the detection subject in the standard image and a position of the detection subject in the reference image.

For example, in the case where the image pickup unit is disposed fixedly and the detection subject moves in a two-dimensional plane, it is possible to determine a distance between the detection subject and the image pickup unit by the position of the detection subject in the picked-up image. With the use of the distance determination of the above-described structure, it is possible to largely reduce the amount operation for calculating the position of the partial image region in which the difference between the state of the pixel values in the partial image regions of the standard image and the state of the pixel values in the partial image regions of the reference image is minimized by deciding the enlargement/reduction ratio based on the position of the detection subject in the standard image and the position of the detection subject in the reference image. That is, the above structure achieves its effect when the image pickup unit is disposed fixedly and the detection subject moves in the two-dimensional plane, particularly when the image pickup unit is a surveillance camera mounted on a ceiling.

Also, in the above-described structure, the image processing apparatus according to this invention may have a structure that the movement detection unit obtains from the image pickup unit two picked-up images obtained by picking up the detection subject from two different points simultaneously and calculates a distance between the detection subject and the image pickup unit in the standard image and a distance between the detection subject and the image pickup unit in the reference image based on the two picked-up images to decide the enlargement/reduction ratio based on the distances.

According to the above-described structure, the distance between the detection subject and the image pickup unit in the standard image and the distance between the detection subject and the image pickup unit in the reference image are calculated based on the two picked-up images simultaneously obtained by picking up the detection subject from the positions different from each other. By deciding the enlargement/reduction ratio based on the distances, it is possible to largely reduce the amount of operation for calculating the position of the partial image region in which the difference between the state of the pixel values in the partial image regions of the standard image and the state of the pixel values in the partial image regions of the reference image is minimized by deciding the enlargement/reduction ratio based on the distances. That is, the above-described structure achieves its effect when the image pickup unit and the movable place of the detection subject are not restricted, particularly when the image pickup unit is an on-vehicle stereo camera for monitoring a frontward direction.

Also, in the above-described structure, the image processing apparatus according to this invention may have a structure that the movement detection unit performs as the predetermined conversion processing a processing of rotating the relative positions of the partial image regions, which are relative to the standard point.

According to the above-described structure, when the orientation of the detection subject in the standard image is different from that of the reference image, it is possible to accurately associate the detection subjects to each other in response to the difference.

Also, in the above-described structure, the image processing apparatus according to this invention may have a structure that the movement detection unit decides a rotation angle based on the position of the detection subject in the standard image and the position of the detection subject in the reference image.

For example, when conditions for the orientation of the detection subject are identified by the position of the detection subject in the picked-up image, it is possible to uniquely decide the rotation angle by preliminary setting a rotation relationship between the regions in the picked-up image. With the use of such rotation relationship, by deciding the position of the detection subject in the standard image and the position of the detection subject in the reference image as described above, it is possible to largely reduce the amount operation for calculating the position of the partial image region at which the difference between the state of the pixel values in the partial image regions of the standard image and the state of the pixel values in the partial image regions of the reference image is minimized.

Also, in the above-described structure, the image processing apparatus according to this invention may have a structure that the movement detection unit obtains the state of the pixel values of the partial image regions by rotating the partial image regions of the reference image.

When an orientation of the detection subject is changed, orientations of the images in the partial image regions also change. In order to deal with such orientation change, not only relative coordinates of the partial image regions but also the images in the partial image regions are rotated. Therefore, it is possible to more accurately associate the detection subject in the standard image to that of the reference image in the case where the orientation of the detection subject changes largely.

The above-described image processing unit may be realized by using a computer, and, when the image processing apparatus is realized with the use of the computer, this invention encompasses an image processing program that causes the computer to realize the image processing apparatus by causing the computer to operate as the above-described units and a recording medium recording the image processing program and readable by the computer.

As described above, the image processing apparatus according to this invention has a structure of comprising a partial image region setting unit for obtaining a picked-up image at a first time point as a standard image from time-series picked-up image data obtained by an image pickup unit picking up a detection subject and selecting a plurality of partial image regions including an image region of the detection subject in the standard image and a movement detection unit for obtaining a picked-up image at a second time point that is different from the first time point as a reference image and detecting a movement of the detection subject between the standard image and the reference image based on a difference between a state of pixel values of the partial image regions of the standard image and a state of pixel values of partial image regions of the reference image, wherein the partial image region setting unit sets a standard point used as a standard for relative positions of the partial image regions; and the movement detection unit obtains the state of the pixel values of the partial image regions of the reference image with the relative positions of the partial image regions with respect to the standard point being unchanged and calculates the difference between the obtained state of the pixel values of the partial image regions and the state of the pixel values of the partial image regions of the standard image to calculate a position of the standard point in the reference image.

As described above, the image processing apparatus according to this invention has a structure of comprising a partial image region setting unit for obtaining a picked-up image at a first time point as a standard image from time-series picked-up image data obtained by an image pickup unit picking up a detection subject and selecting a plurality of partial image regions including an image region of the detection subject in the standard image and a movement detection unit for obtaining a picked-up image at a second time point that is different from the first time point as a reference image and detecting a movement of the detection subject between the standard image and the reference image based on a difference between a state of pixel values of the partial image regions of the standard image and a state of pixel values of partial image regions of the reference image, wherein the partial image region setting unit sets a standard point used as a standard for relative positions of the partial image regions; and the movement detection unit obtains the state of the pixel values of the partial image regions of the reference image by converting the relative positions of the partial image regions with respect to the standard point by a predetermined conversion processing and calculates a position of the standard point in the reference image by calculating the difference between the obtained state of the pixel values of the partial image regions and the state of the pixel values of the partial image regions of the standard image.

As described above, since the image processing is performed on the reduced number pixels for associating the standard image to the reference image without deteriorating detection accuracy, an effect of enabling to provide the image processing apparatus that realizes a detection of movement of a detection subject in a reduced processing time is achieved.

BRIEF DESCRIPTION OF THE DRAWINGS

FIG. 1 is a block diagram showing a schematic structure of a moving object tracking system according to one embodiment of this invention.

FIGS. 2(a) and 2(b) are diagrams showing states in which plural correlation windows are applied to a standard image and a reference image.

FIGS. 6(b) to 6(e) are diagrams showing results obtained by applying four filters to the detection subject region, and FIG. 6(a) is a diagram showing a result obtained by selecting a minimum value from the filtering result values in the processing results shown in FIGS. 6(b) to 6(e).

FIG. 13(a) is a diagram showing, in the case where the detection subject is a car, a state in which the car is picked up when the car is approaching to the image pickup unit while rounding a curve, and FIG. 13(b) is a diagram showing a binary image of the image of FIG. 13(a).

DESCRIPTION OF THE PREFERRED EMBODIMENTS

Figure 3:
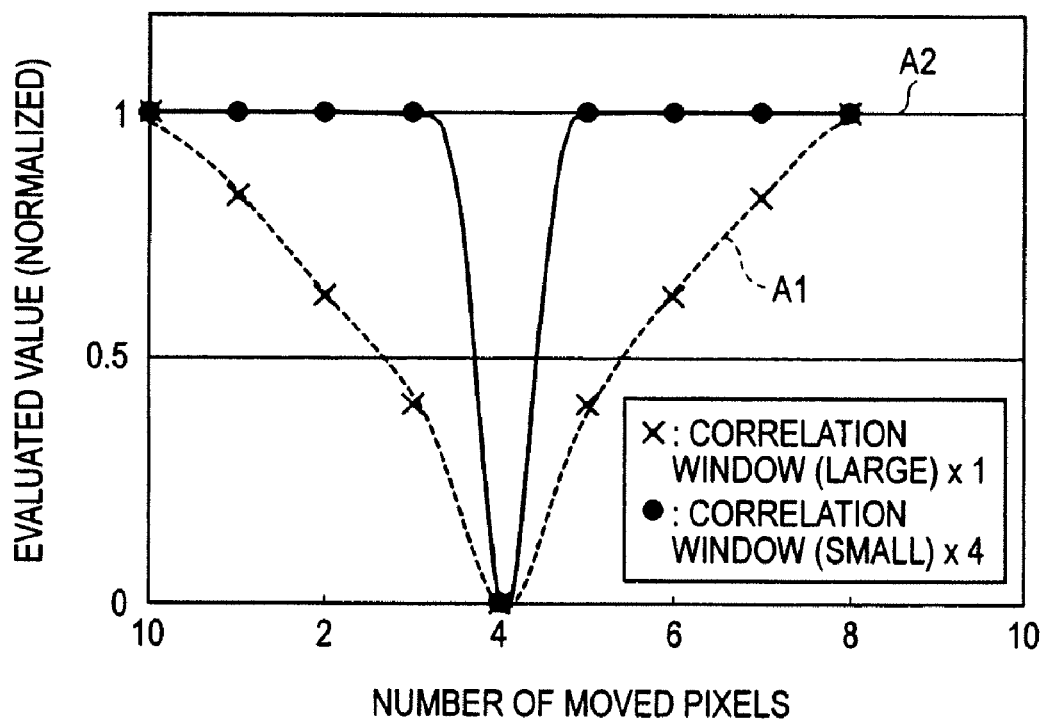
FIG. 3 is a graph showing results obtained by calculating evaluated values by moving the correlation windows in an X-axis direction by employing methods of Comparative Example and this embodiment.

Hereinafter, one embodiment of this invention will be described based on the drawings.

(Structure of Moving Object Tracking System)

FIG. 1 is a block diagram showing a schematic structure of a moving object detection system 1 according to this embodiment. This moving object detection system 1 is provided with an image pickup unit 2, an image processing unit (image processing apparatus) 3, and a display unit 4 as shown in FIG. 1.

The image pickup unit 2 picks up a detection subject which is a subject of movement detection and the image pickup is performed with the use of a CCD (charge coupled device) image pickup element, a CMOS (complementary metal oxide semiconductor) image pickup element, or the like. The image processing unit 3 recognizes the detection subject included in the picked-up image based on the picked-up image obtained by the image pickup unit 2 to perform an image processing for detecting a movement of the detection subject. The display unit 4 displays the picked-up image obtained by the image pickup unit 2 as well as a movement detection result of the detection subject obtained by the image processing unit 3 and is provided with various display devices capable of displaying images such as a CRT (Cathode Ray Tube) and a liquid crystal display device.

The image processing unit 3 is provided with a picked-up image storage control unit 11, a detection subject region setting unit 12, a correlation window setting unit 13, a movement detection unit 14, an output control unit 15, an image storage unit 21, a detection subject region storage unit 22, a correlation window storage unit 23, and a movement detection information storage unit 24.

The picked-up image storage control unit 11 receives moving image data from the image pickup unit 2 as time-series picked-up image data obtained by the image pickup unit 2 and perform a processing for storing the moving image data in the image storage unit 21. The detection subject region setting unit 12 takes out the picked-up image stored in the image storage unit 21 to extract the detection subject and performs a processing for setting a detection subject region including an image region extracted as the detection subject. Information of the set detection subject region is stored in the detection subject region storage unit 22.

The correlation window setting unit 13 selects plural characteristic points from the detection subject region set by the detection subject region setting unit 12 and performs a processing for setting a correlation window (partial image region) for each of the characteristic points. Information of the set correlation windows is stored in the correlation window storage unit 23.

The movement detection unit 14 acquires the picked-up images stored in the image storage unit 21 and performs an evaluation operation using the correlation windows set by the correlation window setting unit 13, thereby associating the detection subjects to each other in the picked-up images as well as detecting a movement of the detection subject. Information of the detected detection subject movement is stored in the movement detection information storage unit 24.

The output control unit 15 performs control for causing the picked-up images stored in the image storage unit 21 to be displayed by the display unit 4 as well as control for causing the information indicating the movement of the detection subject detected by the movement detection unit 14 to be displayed by the display unit 4. The display of the picked-up images may be performed substantially simultaneously with the image pick-up by the image pickup unit 2 on real-time basis or may be performed at a time point after the image pickup.

Though the picked-up images and the movement detection information are displayed on the display unit 4 by the output control unit 15 in this embodiment, the output control unit 15 may have any structure insofar as the output control unit 15 outputs the picked-up images and the movement detection information. For example, the output control unit 15 may have a structure that the picked-up images stored in the image storage unit 21 and the movement detection information stored in the movement detection information storage unit 24 are sent to an external device so that the movement detection result is confirmed in the external device.

COMPARISON WITH COMPARATIVE EXAMPLE

Figures 2A, 2B:
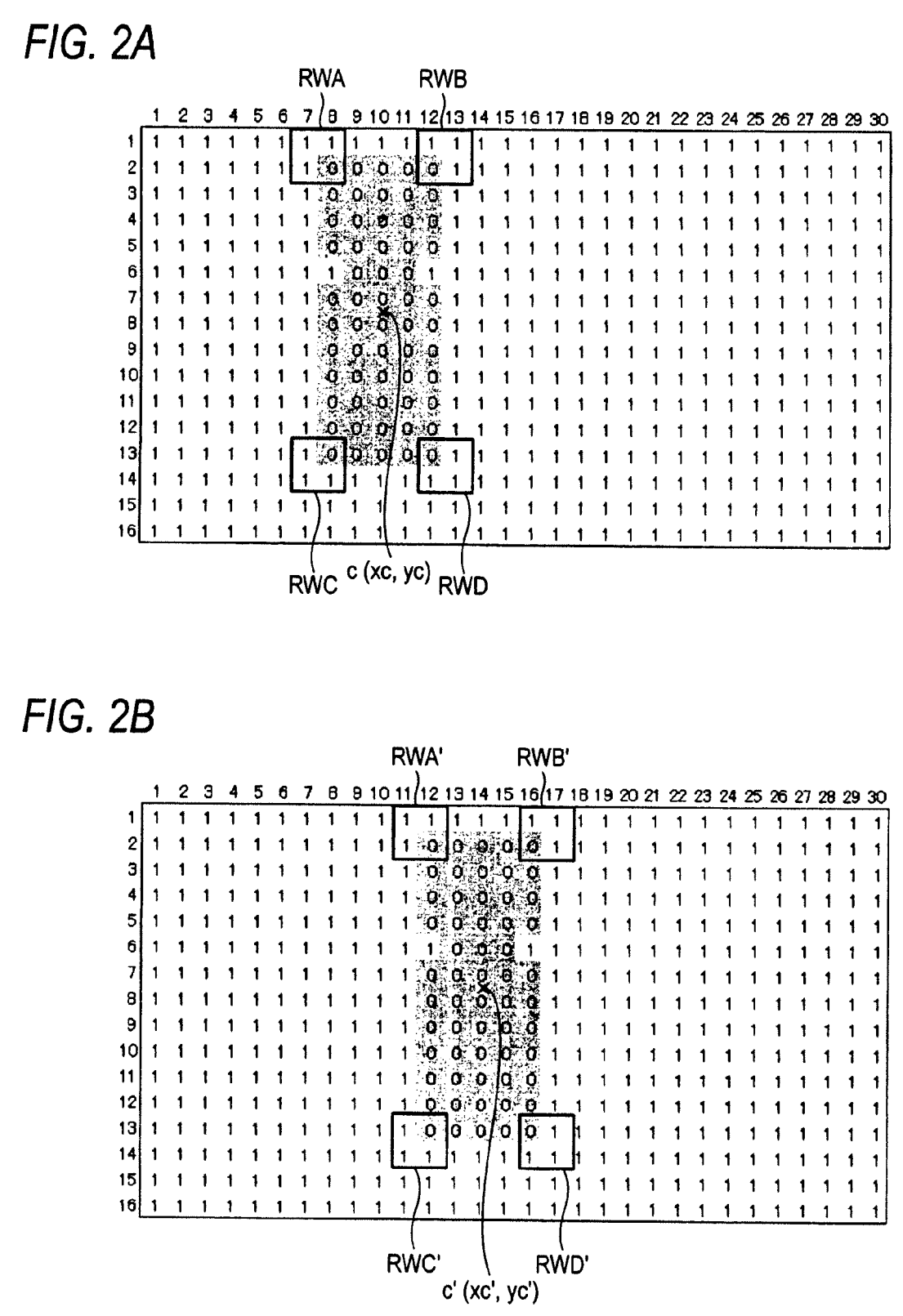

A comparison between a case of setting a region including an entire image region of a detection subject in one correlation window and a case of setting plural correlation windows are set as in the embodiment of this invention will be described. As Comparative Example, a case of setting a region including an entire image region of a detection subject in a correlation window RW will be described as Comparative Example with reference to FIGS. 22(*b*) and 22(*c*), and then the method of setting correlation windows in this embodiment will be described with reference to FIGS. 2(*a*) and 2(*b*).

Shown in FIG. 22(*a*) is a state of movement of a detection subject in a moving image. In this example, a state in which the detection subject moves from a position A to a position B is shown.

Shown in FIG. 22(*b*) is a state (standard image) of pixel values when the detection subject is at the position A, and shown in FIG. 22(*c*) is a state (reference image) of pixel values when the detection subject has moved to the position B. In order to simplify the description, the pixel value is represented by binary values of 0 or 1. Also, a pixel value of a region in which the detection subject exists is represented by 0, and a pixel value of a region other than the region in which the detection subject exists is represented by 1.

Figures 22A, 22B, 22C:
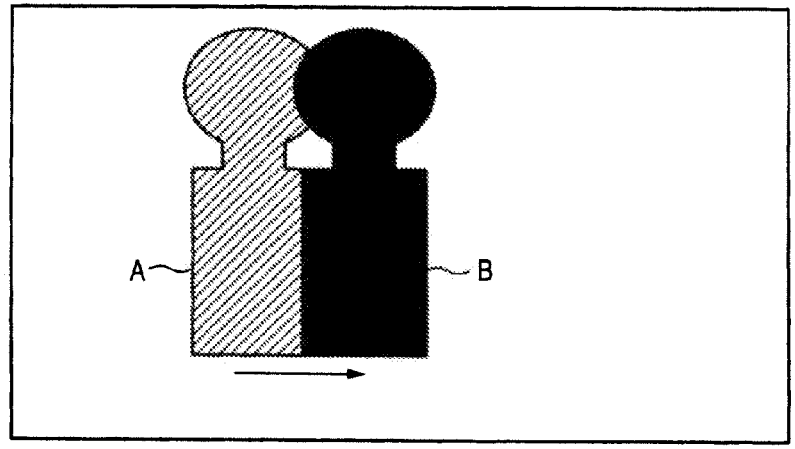
FIG. 22(*a*) is a diagram showing one example of state of movement of the detection subject in a moving image, and FIGS. 22(*b*) and 22(*c*) are diagrams showing a standard image and a reference image of Comparative Example, to each of which one correlation window is applied.

In Comparative Example, a region including the entire image region of the detection subject is set as the correlation window RW as shown in FIG. 22(b) based on the standard image. Then, a correlation window RW for a central pixel C (xc, yc) is searched in the reference image. More specifically, an evaluation operation is performed by setting a correlation window RW' having the size identical to that of the correlation window RW for each of pixels (x'c, y'c) in the reference image with the pixel (x'c, y'c) being set as the center of the correlation window RW'.

For example, when assuming the case wherein the detection subject moves only in a horizontal direction (X-axis direction) in the image data, the following expression is set as one example of evaluation function.

[Expression 1]

In Expression 1, k represents a pixel value (x0, y0: original pint of correlation window coordinate system) in coordinates in the correlation window RW of the standard image, and k' represents a pixel value (x'0, y'0: original pint of correlation window coordinate system) in coordinates in the correlation window RW' of the reference image. Also, M and N represents a horizontal pixel number and a vertical pixel number of the set correlation window. When each of M and N is an odd number, a value of M/2 or the like is appropriately converted into an integer.

In this case, the position of the central pixel when the evaluated value E is minimum is determined as the center position of the detection subject region, and the position of RW' when the evaluated value E is minimum is determined as the position of the detection subject in the reference image.

When moving the correlation window RW in the X-axis direction, the position of the correlation window RW at which the evaluated value E (x'c, y'c) obtained by Expression 1 is minimized is determined as the position of the detection subject in the reference image.

Though only the movement in the X-axis direction is considered in the above example, it is possible to detect a movement in an arbitrary direction in a two dimensional plane by considering a movement in Y-axis direction.

In Comparative Example, the correlation window RW having the size of including the entire image region of the detection subject is set on the standard image. That is, the operation of Expression 1 is performed by using the pixel values of the entire pixels included in the correlation window RW. As is apparent from Expression 1, a processing time is increased with an increase in the number of pixels subjected to the operation. Therefore, in order to shorten the processing time, it is desirable to reduce the number of pixels for the operation.

Shown in FIG. 2(a) is a state of employing the method of setting the correlation window in this embodiment. As shown in FIG. 2(a), four correlation windows RWA to RWD are set on four small regions each including a part of the image of the detection subject.

After that, a pixel C (xc, yc) which is the center of the correlation windows RWA to RWD is set as a standard point, and a corresponding point for the standard point is searched in a reference image. More specifically, an evaluation operation is performed by setting correlation windows RWA' to RWD' having the size identical to those of the correlation windows RWA to RWD around pixels (xc', yc') in the reference image at relative positions which are identical to those of the correlation windows RWA to RWD. Specifically, by calculating in the reference image a position of a standard point c' defining the correlation windows RWA' to RWD' that minimize a difference with the pixel values in the correlation windows RWA to RWD, and a position of the detection subject in the reference image is calculated based on the position of the standard point c'.

As described above, the movement detection is performed by using the plural small correlation windows each including a part of the detection subject in this embodiment. That is, it is possible to precisely determine characteristics of the detection subject by using the plural correlation windows, and, it is possible to reduce the number of pixels in each of the correlation windows to that required for determining a part of the characteristics of the detection subject. Accordingly, though the number of correlation windows is increased, it is possible to largely reduce the number of pixels included in each of the correlation windows, and, as a result, it is possible to reduce the number of pixels subjected to the operation. Therefore, it is possible to realize a reduction in processing time.

In this invention, since the standard point is different from the central point of each of the correlation windows, it is impossible to calculate the evaluated value E by using Expression 1 as it is. Accordingly, the inventors of this invention performed expansion as indicated by Expression 2 described later in this specification. With Expression 2, it is possible to define an evaluated value for a small correlation window group, and it is possible to detect a movement of an object by calculating a position of (xc', yc') at which the evaluated value is minimized. Details of Expression 2 will be described later in this specification.

Shown in FIG. 3 are a result of Comparative Example described above and a result of calculation of an evaluated value with correlation windows being moved in the X-axis direction according to the method of this invention. In FIG. 3, a graph A1 shows the case of Comparative Example, and a graph A2 shows the case of this embodiment. The horizontal axis indicates the number of moved pixels, and the vertical axis indicates the evaluated value calculated by Expression 1. The evaluated value is normalized by setting the maximum value to 1. As is apparent from the graphs, the evaluated value is 0 when the number of moved pixels is 4 in each of the cases, and detection subject movement amounts detected by the methods are identical to each other (movement amount (number of pixels)=4).

In terms of the shapes of graphs, the peak in the graph of this embodiment is sharper than that of the graph of Comparative Example. It is considered that the image actually picked up includes various noises due to an optical fluctuation, an electrical fluctuation, distortion due to a lens, and the like. Such noises influence on the calculation of evaluated value, and it is assumed that the noises are included in the graphs shown in FIG. 3 in an operation result based on an actual image. When such noises are overlapped with a graph, it is considered that a peak position becomes indefinite in the case of a gentle peak while it is assumed that the peak position does not become indefinite when an amount of the noises is not too large in the case of a sharp peak. That is, according to the method of this embodiment, it is possible to accurately detect a movement amount of a detection subject when some noises are included.

(Flow of Movement Detection Processing)

Hereinafter, a flow of a movement detection processing in this embodiment will be described with reference to a flowchart shown in FIG. 4. In Step 1 (hereinafter referred to as S1), an image pickup processing on a region including a detection subject by the image pickup unit 2 is started. The image pick up processing is a moving image pickup. Image data picked up by the image pickup unit 2 are stored in the image storage unit 21 in the order of frames based on the control by the picked-up image storage control unit 11.

Next, the detection subject region setting unit 12 takes out one of frames of the moving image data stored in the image storage unit 21 as a standard image and extracts at least one detection subject from the standard image (S2). A typical example of a method for extracting detection subject includes a template matching method. The template matching method is an image processing method for assuming a position, an angle, a scale, and the like of an image corresponding to the template image based on a prepared template image. The detection subject region setting unit 12 in this embodiment performs the detection subject extraction by the template matching method, but the detection subject extraction may be performed by any other method.

Next, the detection subject region setting unit 12 sets a detection subject region including an image region extracted as the detection subject (S3). In this embodiment, an outer rim of the detection subject region is set to a position that is outside from an outer rim of the image region extracted as the detection subject by several pixels (2 to 6 pixels, for example). Also, the thus-set detection subject region is formed into a rectangular region having M pixels in the longitudinal direction and N pixels in the horizontal direction (each of M and N is an integer). In the case of extracting the detection subject by the template matching method as described above, the shape of the detection subject region may be set in accordance with the prepared template image.

The set shape information of the detection subject region is stored in the detection subject region storage unit 22. Though the detection subject region is the longitudinal region in this embodiment, the shape is not limited thereto and may be an arbitrary one depending on the shape of the detection subject.

Next, the correlation window setting unit 13 extracts plural characteristic points from the detection subject region including the image region of the detection subject (S4). After that, the correlation window setting unit 13 sets a correlation window for the extracted characteristic points and a standard point (S5). Details of the characteristic points extraction processing and the processing for setting the correlation windows and the standard point will be described later in this specification.

Next, the movement detection unit 14 obtains image data of the standard image and image data of the reference image corresponding to the next frame of the standard image from the image storage unit 21 (S6). After that, the movement detection unit 14 performs an evaluation operation using the correlation windows and the standard point set in S5 to detect a movement of the detection subject by determining corresponding point (point corresponding to the standard point) with which the evaluated value is minimized and smaller than a predetermined threshold value on the reference image (S7). Details of the movement detection processing will be described later in this specification.

Next, the output control unit 15 performs a processing of outputting the reference image stored in the image storage unit 21 and information indicating the movement of the detection subject detected by the movement detection unit 14 (S8). Specifically, the output control unit 15 performs control for causing the display unit 4 to display the movement detection result. The display of the movement detection result is performed in such a manner that a graphic enabling to identify the detection subject is displayed and moved along the movement of the detection subject or a movement locus of a specific part of the detection subject is displayed.

After that, whether or not the processing is to be terminated is judged in S9, and, when it is judged that the processing is not terminated yet, the reference image at the time of the judgment is set as the standard image, and the corresponding point detected in S7 is set as the standard point to start processing from S6 again by setting the next frame as the reference image (S10).

Though the frame subsequent to the standard image is set as the reference image in the above example, the reference image is not limited thereto and may be set at a predetermined frame interval.

(Characteristic Point Extraction Processing and Correlation Window Setting Processing)

Figure 5:
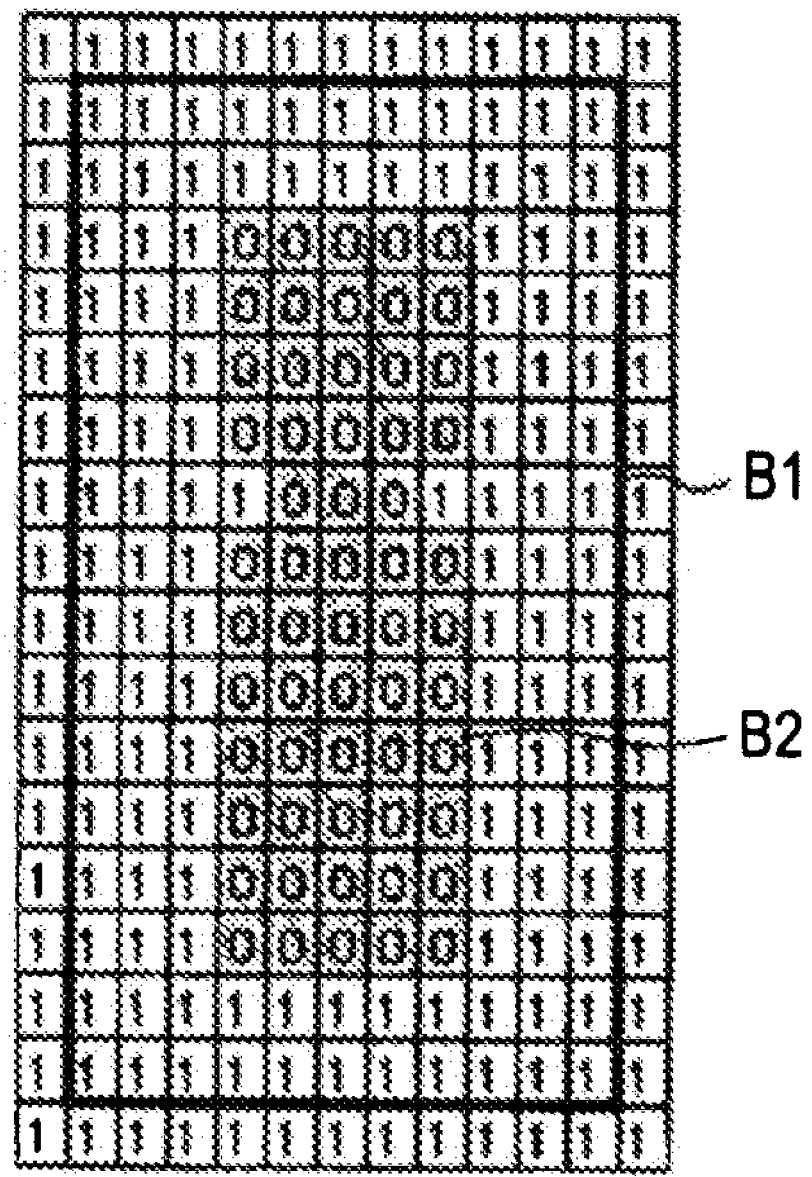
FIG. 5 is a diagram showing one example of image of the detection subject and one example of detection subject region set by a detection subject region setting unit.

Hereinafter, the details of the characteristic point extraction processing and the correlation window setting processing performed by the correlation window setting unit 13 will be described. Shown in FIG. 5 are a detection subject B2 which is one example of image of the detection subject and one example of detection subject region B1 set by the detection subject region setting unit 12. In the examples shown in FIG. 5, the detection subject region B1 is a longitudinal region having M pixels in the vertical direction and N pixels in the horizontal direction (each of M and N is an integer). Also, upper and lower sides of an outer rim of the detection subject region B1 is outside of upper and lower ends of an outer rim of the detection subject B2 by 2 pixels, and left and right sides of the outer rim of the detection subject region B1 are outside of left and right ends of the outer rim of the detection subject B2 by 3 pixels.

Inside the detection subject region B1 set as described above, the correlation window setting unit 13 extracts the plural characteristic points from an image region of the detection subject B2. Points that characterizing a partial shape of the detection subject B2 may preferably be selected as the characteristic points. By thus selecting the characteristic points, it is possible to accurately associate the detection subject B2 in the standard image to the detection subject B2 in the reference image in the movement detection processing.

Also, it is preferable that a contrast between the characteristic points and the surrounding pixels is high. When the contrast between the characteristic points and the surrounding pixels is high, it is possible to ensure a difference in pixel value between the characteristic points and the surrounding pixels when some noises are generated as well as to suppress the characteristic points from being hidden by the noises.

It is preferable that the characteristic points are selected evenly from the entire part of the image region of the detection subject B2. When the characteristic points are selected from one part of the image region of the detection subject B2, the association is not based on the entire shape of the detection subject B2, thereby increasing possibility of a failure in the association processing.

In view of the foregoing, the characteristic points are selected as follows in this embodiment. The correlation window setting unit 13 creates four filters for extracting four corners, i.e. an upper left corner, an upper right corner, a lower left corner, and lower right corner, within the shape of the detection subject B2. The filters are referred to as the first filter F1, the second filter F2, the third filter F3, and the fourth filter F4. In the case where it is unnecessary to discriminate the first to forth filters F1 to F4 from one another, each of the filters is referred to as the filter F. In the case of extracting the detection subject by the template matching method, the first to fourth filters F1 to F4 are created corresponding to the template image in advance of the characteristic point extraction.

Each of the filters F is in a matrix arrangement of m×n (each of m and n is an integer; m<M and n<N), and a value of each of elements is set to 0 or 1 depending on the detection shape. By applying the filters F to the pixels of the detection subject region B1 to calculate a value which is a sum of absolute values of differences between the values of the elements of the filters F and the values of the pixels of the corresponding detection subject region B1 as a filtering result. With such filtering processing, the filtering result values of the pixels corresponding to the characteristic points to be detected by the filters F becomes lower than values of other pixels.

Shown in FIG. 6(b) is the matrix arrangement of the first filter F1 and the result obtained by applying the first filter F1 to the detection subject region B1; shown in FIG. 6(c) is the matrix arrangement of the second filter F2 and the result obtained by applying the second filter F2 to the detection subject region B1; shown in FIG. 6(d) is the matrix arrangement of the third filter F3 and the result obtained by applying the third filter F3 to the detection subject region B1; and shown in FIG. 6(e) is the matrix arrangement of the fourth filter F4 and the result obtained by applying the fourth filter F4 to the detection subject region B1.

Shown in FIG. 6(a) is a result of selecting a minimum value of the filtering result values in the processing results shown in FIGS. 6(b) to 6(e) for the pixels. As shown in FIG. 6(a), the filtering result values corresponding to the upper left, upper right, lower left, and lower right four corners of the detection subject B2 are 0, and these four pixels are selected as the characteristic points.

Note that it is considered that the filtering result value to be selected as the characteristic point may not be 0 since the ideal pixel values shown in FIG. 5 are not achieved in an actual image due to the noises included in the actual image. Therefore, a filtering result threshold value Cth for the filtering result value to be selected as the characteristic point is set in an actual processing, and a pixel achieving a filtering result value smaller than the filtering result threshold value Cth is selected as the characteristic point.

The size of the correlation window is set to be the same as that of the matrix of the filter F. The size of the correlation window and the size of the filter F may be a constant value or may be varied depending on the size of the detection subject region B1. In the case of varying the sizes depending on the size of the detection subject region B1, each of the sizes of the correlation window and the filter F may be set in accordance with a proportion of the size to the size of the detection subject region B1, such as (M/4)×(N/4) when the size of the detection subject region is represented by M×N.

In the case where a large number of pixels has the filtering result value smaller than the filtering result threshold value Cth, all of these pixels may be selected as the characteristic points, but the number of pixels requiring the association in the movement detection processing is increased when the entire pixels are selected as the characteristic point, thereby undesirably increasing the processing time. Therefore, it is preferable to perform thinning of the characteristic points as described below.

An upper limit value Nth for the number of characteristic points is set in advance of the thinning processing. The upper limit value Nth is set for the purpose of preventing the processing time to become unnecessarily long. When the number of pixels each having the filtering result value smaller than the filtering result threshold value Cth exceeds the upper limit value Nth, the thinning processing is performed based on the following standards. As the first standard, a method of selecting Nth characteristic points in an ascending order of filtering result values is employed. As the second standard, a method of selecting Nth characteristic points in an ascending order of distances from the corners of the outer rim of the detection subject region B1 is employed. As the third standard, Nth characteristic points are selected in an ascending order of distances from the sides of the outer rim of the detection subject region B1.

According to the first standard, since the pixels in the pixel regions closer to the filters F for detecting the characteristic points are selected as the characteristic points, it is possible to more accurately perform the association in the movement detection processing. According to the second and third standards, since the pixels closer to the outer rim of the detection subject region B1 are selected as the characteristic points, it is possible to enhance the possibility for the characteristic points to be selected from the entire image region of the detection subject B2, thereby enabling to more accurately perform the association due to the realization of the association based on the entire shape of the detection subject B2.

Though the sizes of the filter F and the correlation window are set to the identical value in the above example, the sizes may be different from each other.

(Movement Detection Processing)

Hereinafter, the movement detection processing by the movement detection unit 14 will be described. The movement detection unit 14 obtains the image data of the standard image and the image data of the reference image and performs the evaluation operation based on the correlation windows set by the correlation window setting unit 13. In this case, it is assumed that the Nth characteristic points have been selected by the correlation window setting unit 13, and that coordinates of the selected characteristic points are defined as (x0, y0), (x1, y1), (x2, y2), . . . (xNth−1, yNth−1). The following operation using an evaluation function is performed for the pixels of the reference image based on expansion of expression using SAD (Sum of Absolute Difference).

[Expression 2]

Figure 7A:
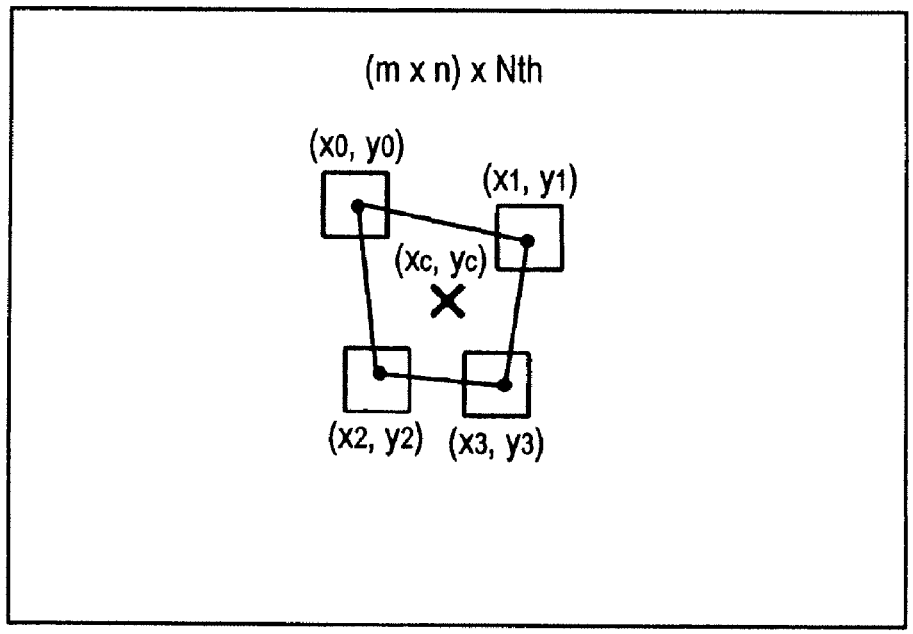
FIGS. 7(a) and 7(b) are diagrams showing states of central coordinates of the plural correlation windows and the detection subject in the standard image and the reference image.

In Expression 2, (xc, yc) indicates a central coordinate (standard point) of the detection subject on the standard image as shown in FIG. 7(a). The central coordinate of the detection subject is a barycentric position of the selected plural characteristic points. That is, (xc, yx) is represented by the following expression.

[Expression 3]

Relative coordinates for the central coordinate of the points are represented by the following expression.

[Expression 4]

Figure 7B:
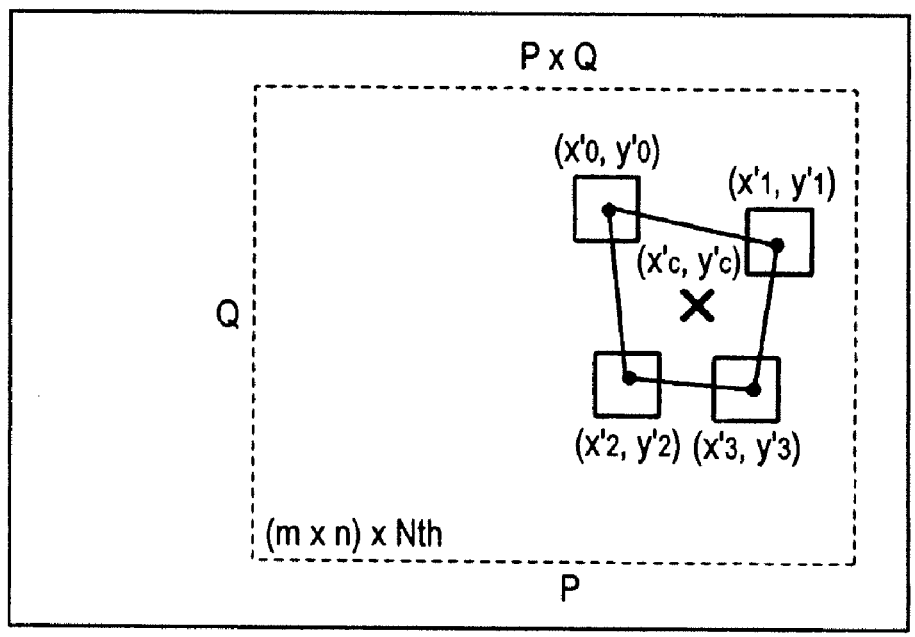

As shown in FIG. 7(b), (x'c, y'c) indicates a central coordinate of the detection subject on the reference image. In this case, (x'c, y'c) is set in a range (search range: P×Q pixel region (each of P and Q is an integer) in which the detection subject can move.

The search range is set as follows. When the detection subject is a car, for example, and the car travels on a specific road, the detection subject travels in one direction unless the car is at an intersection. Also, by using a time interval which is correlative to an assumed speed of the detection subject (200 km/h for a car, for example), it is possible to detect a distance that the detection subject moves in a certain period. By combining the travel direction information and the movable distance information, it is possible to set the search range as "the range in the detection subject can move".

A pixel value in each of the coordinates of the correlation windows of the standard image is represented by k, and a pixel value in each of coordinates in the correlation windows of the reference image is represented by k'. A horizontal pixel number of each of the set correlation windows is represented by m, and a vertical pixel number of each of the set correlation windows is represented by n. In the case where each of m and n is an odd number, a value such as m/2 is appropriately converted into an integer.

The movement detection unit 14 considers a pixel position on the reference image at which the evaluated value E (x'c, y'c) is minimized as the central coordinate of the detection subject on the reference image. That is, a difference between the central coordinate of the detection subject on the standard image and the central coordinate of the detection subject on the reference image is considered to be a movement amount of the detection subject.

Though barycentric coordinate of the plural characteristic points is used as the standard point in the above example, the standard point is not limited to the example, and any position may be set as the standard point insofar as the position is determined unambiguously based on the selected characteristic points. As such standard point, one characteristic point selected among the plural characteristic points based on a predetermined standard, a midpoint of two characteristic points selected based on a predetermined standard, or the like may be used.

Though the processing is performed by assuming the image data as data formed from one color component, such as a monochrome image, in the above example, the image data is not limited to the monochrome image, and the movement detection processing may be performed on color components by using data formed from three color components of colors of RGB. However, since the processing time is increased for the plural colors in the case of performing the processing on plural color components, it is preferable to perform the processing on the data formed from one color component when it is possible to perform the movement detection based on one color component. Also, in the case where the image data are color image data, the above-described movement detection processing may be performed by comparing colors of the pixels.

(Processing in the Case where Size of Detection Subject Changes)

Figure 8:
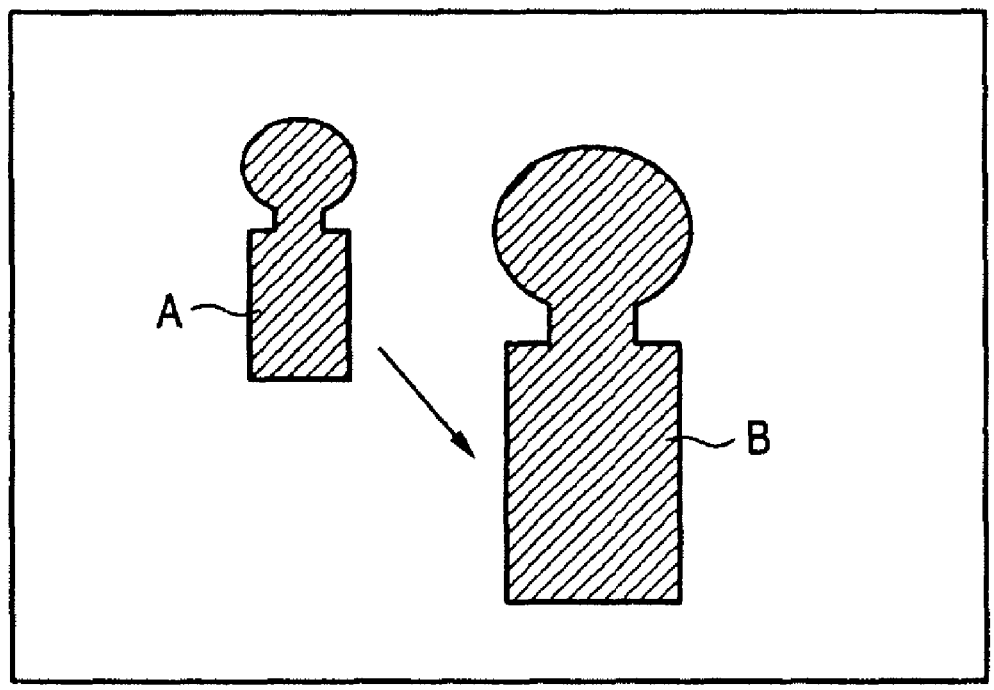
FIG. 8 is a diagram showing a change in size of the picked-up image in the case where the detection subject moves in such a manner as to approach to the image pickup unit.

In the case where a movement of a detection subject occurs in such a manner that a distance between the detection subject and the image pickup unit 2 changes, the size of the detection subject in the image region changes on an image picked up by the image pickup unit 2. Shown in FIG. 8 is a state in which the detection subject that has existed at a position A moves to a position B in a direction approaching to the image pickup unit 2. In this case, the size of the detection subject at the position B is larger than the size of the detection subject at the position A.

Figure 9A:
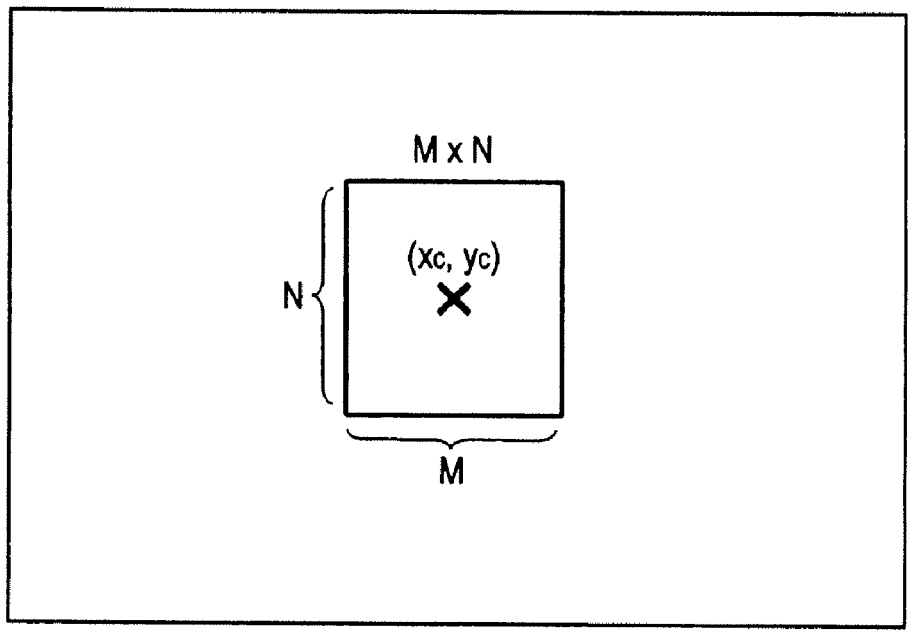
FIGS. 9(a) and 9(b) are diagrams showing a state of Comparative Example in which one correlation window is set in each of the standard image and the reference image in the case where the size of the detection subject changes.
Figure 9B:
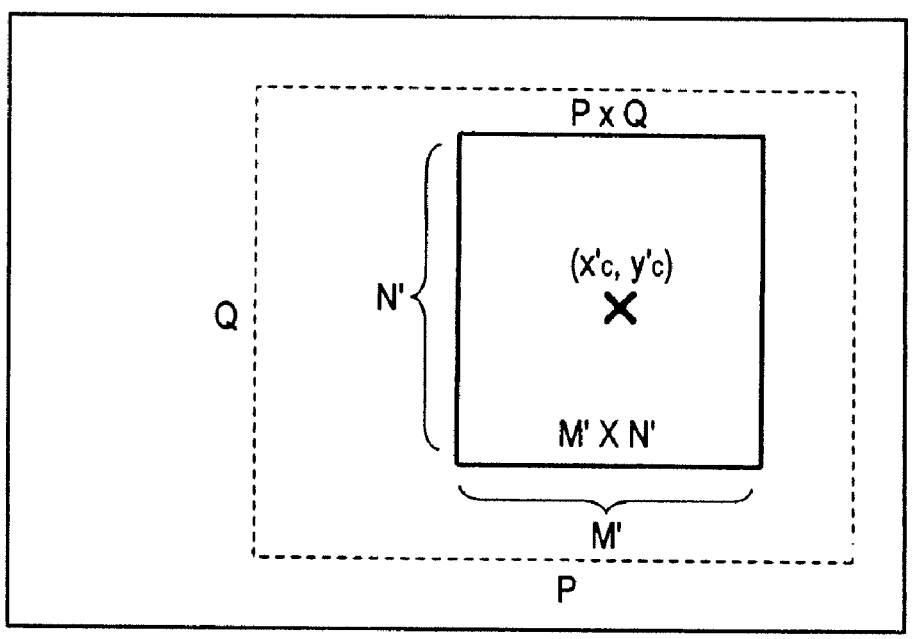

Hereinafter, a case of setting a region including an entire image region of a detection subject as a correlation window will be described as Comparative Example. In this case, as show in FIGS. 9(a) and 9(b), the correlation window in the standard image and the correlation window in the reference image differs in size. When the standard image and the reference image differ from each other in correlation window size, it is impossible to perform the above-described movement detection using the evaluation factor. Therefore, in this case, the movement detection unit 14 performs a processing of enlarging the image in the correlation window M×N in the standard image to the size of the correlation window in the reference image, i.e. to the image of M'×N'. Since the numbers of pixels included in the standard image and the reference image becomes the same by the enlargement processing, it is possible to perform the movement detection using the evaluation factor in this state.

However, in this Comparative Example, there are problems that a time for the image enlargement processing is required and that the evaluation operation processing time is increased due to the increase in pixel number. Though it is possible to set the numbers of the pixels to an identical value by reducing the size of the correlation window in the reference image to the size of the correlation window in the standard image, the size of the correlation window is relatively large, and the processing time is still long.

In contrast, by performing the following processing by the movement detection unit 14 in this embodiment, it is possible to deal with the enlargement/reduction of a detection subject with the sizes of the correlation windows of the standard image and the reference image being the same.

Figure 10A:
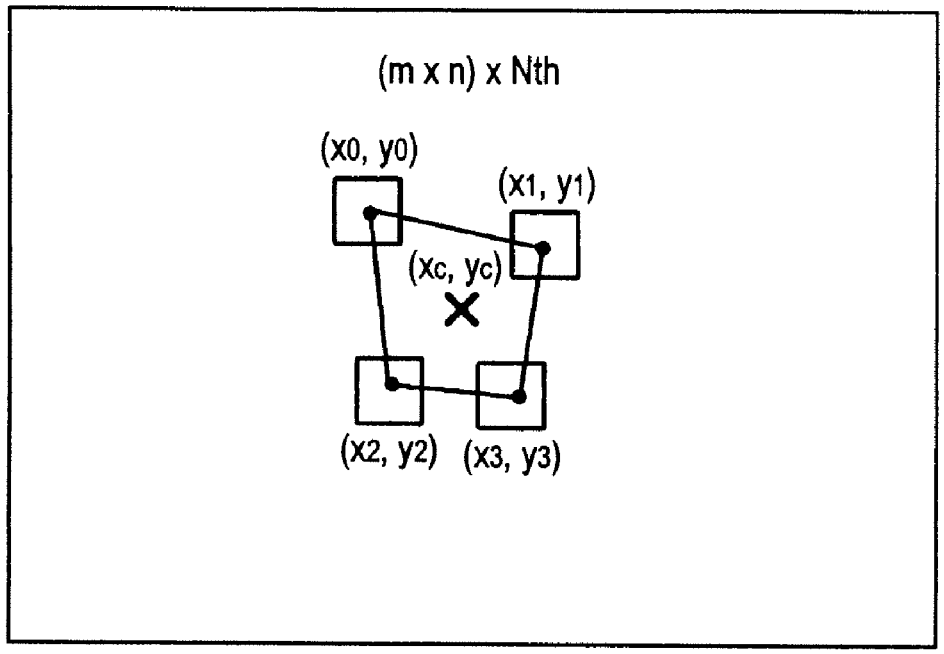
FIGS. 10(a) and 10(b) are diagrams showing a state of this embodiment in which the plural correlation windows are set in each of the standard image and the reference image in the case where the size of the detection subject changes.
Figure 10B:
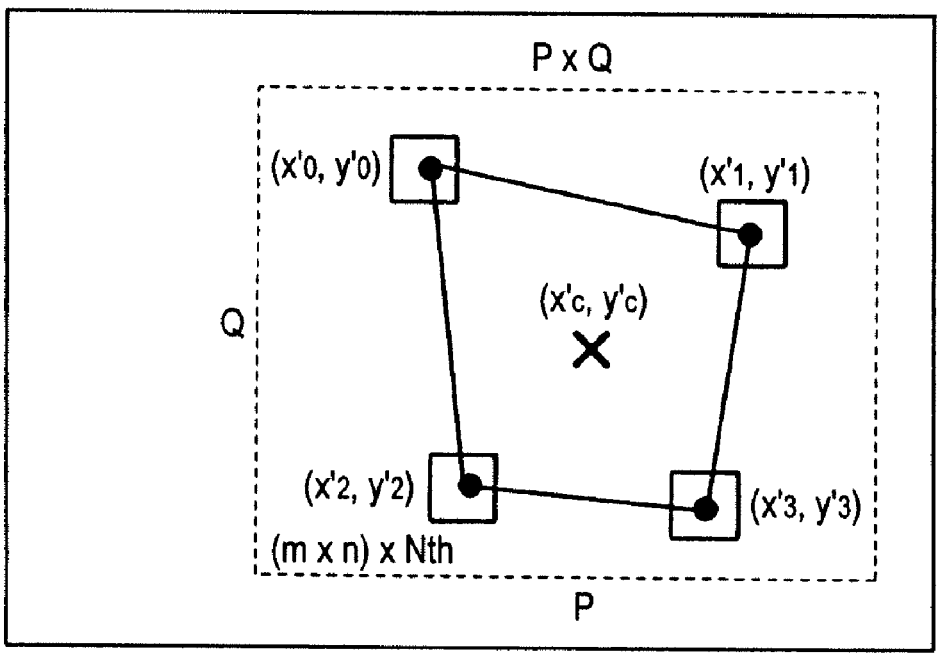

As shown in Expressions 2 and 4, in the case of performing the operation of the evaluation factor, each of the coordinates in the correlation windows is represented by a relative position from the central coordinate (standard point) of the detection subject. Therefore, in order to deal with the enlargement/reduction of the detection subject, a length corresponding to the relative coordinate of the central coordinate (xc, yc) of the detection subject and each of the central coordinates of the correlation windows (xci, yxi) (i=0, 1, 2, . . . Nth−1) is enlarged or reduced as shown in FIGS. 10(a) and 10(b). That is, when an enlargement reduction ratio is K, it is possible to deal with the enlargement/reduction of the detection subject only by changing the relative coordinates as described in the following expression with the sizes of the correlation windows of the standard image and the reference image being the same. (xci, yci)=K(xci, yci), wherein i=0, 1, 2, . . . . Nth−1

After converting the relative coordinates as described above, an evaluated value is obtained by using the evaluation factor represented by Expression 2. With such processing, it is sufficient to convert the relative position between the correlation windows and the central coordinate of the detection subject, and it is unnecessary to change the size of the correlation window. That is, since the number of pixels to be processed is not increased when the image region of the detection subject is enlarged due to the approach of the detection subject, it is possible to deal with the enlargement without causing the increase in processing time.

(Determination of Enlargement/Reduction Ratio)

Basically, a value of the enlargement/reduction ratio K is not decided uniquely and varies largely depending on the size of the picked-up image of the detection subject. Therefore, in actuality, several types of enlargement/reduction ratios are given to perform the evaluation operation so that pixels that achieve the best correlativity (pixels having evaluation values nearly equal to 0) are ultimately selected for performing the movement detection. That is, in order to reduce the processing time, it is preferable to narrow down a range of values of the enlargement/reduction ratios K.

The size of the detection subject on the picked-up image is inversely proportional to the distance between the detection subject and the image pickup unit 2. That is, in the case where the distance between the detection subject and the image pickup unit 2 has changed from L1 to L2 due to a movement of the detection subject, the value of the enlargement/reduction ratio K becomes L1/L2. Therefore, when it is possible to detect the distance between the detection subject and the image pickup unit 2, it is possible to uniquely decide the value of the enlargement/reduction ratio K.

Figure 11:
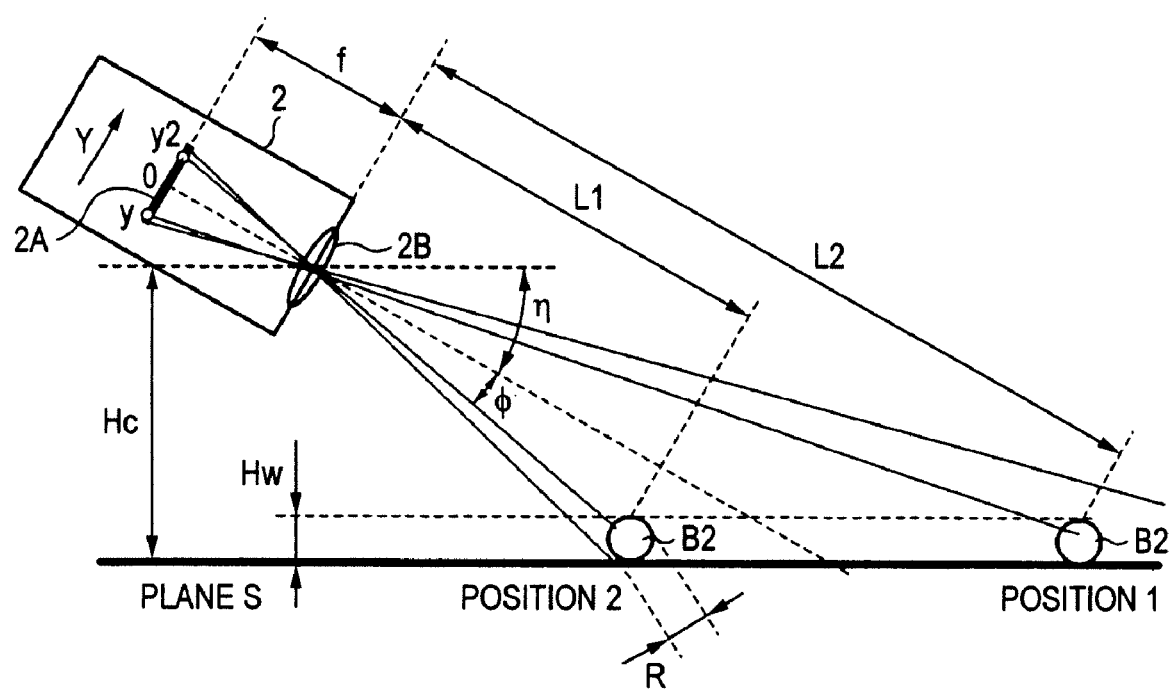
FIG. 11 is a side view showing an image pickup environment in which the image pickup unit is disposed as being fixed with respect to the detection subject moving on a plane.

For example, in the case where the image pickup unit 2 is disposed as being fixed with respect to a detection subject moving on a plane S as shown in FIG. 11, the movement detection unit 14 calculates a distance between the detection subject and the image pickup unit 2 based on a position of the detection subject on a picked-up image. That is, when an angle formed by a straight line connecting a Y coordinate y of a projection position of the detection subject in the image pickup element 2A provided in the image pickup unit 2 to the center of the image pickup lens 2B provided in the image pickup unit 2 and an optical axis of the image pickup lens 2B is represented by φ, the distance L between the image pickup unit 2 and the detection subject is represented by the following expression.

[Expression 5]

In Expression 5, Hc represents a height at the center of the image pickup lens in a direction of a normal line with respect to the plane S; Hw represents a height of the detection subject in a direction of a normal line with respect to the plane S; η represents an angle formed by the optical axis of the image pickup lens 2B and the plane S; and f represents an optical distance between the image pickup lens 2B and the image pickup element 2A.

That is, since it is possible to detect the Y-coordinate y on the image pickup element 2A from the picked-up image, it is possible to calculate the distance between the image pickup unit 2 and the detection subject according to Expression 5. Therefore, in the case where the image pickup unit 2 is fixedly disposed and the detection subject moves in the two-dimensional plane, it is possible to uniquely decide the value of the enlargement/reduction ratio K depending on the position to which each of the correlation windows is applied in the reference image.

(Determination of Enlargement/Reduction Ratio by Stereo Image)

In the above example, the value of the enlargement/reduction ratio K is uniquely decided on condition that the detection subject moves in the two-dimensional plane. However, in the case where the movement range of the detection subject moves in a three-dimensional space in an unspecified manner, it is impossible to uniquely decide the value of the enlargement/reduction ratio K since the value of Hw in Expression 5 changes.

Figure 12:
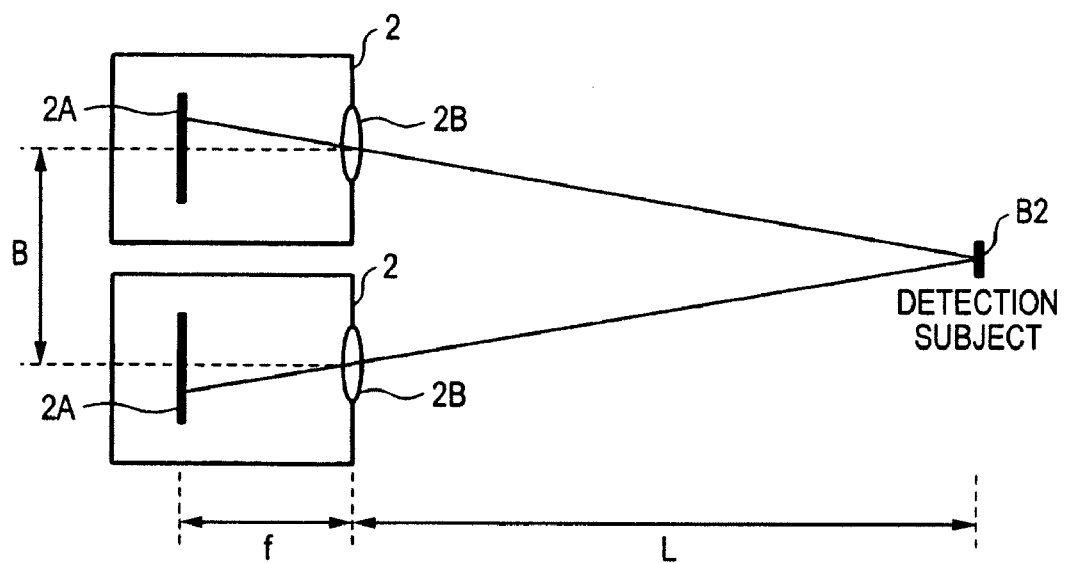
FIG. 12 is a diagram showing an image pickup environment in which two image pickup units are provided.

As a structure for dealing with such case, a structure wherein two image pickup units 2 are provided as shown in FIG. 12 is provided. By providing two image pickup unit 2 and picking up the identical detection subject B2 by each of the image pickup units 2, it is possible to obtain two images of the detection subject B2 which are picked up from different angles. It is possible to uniquely decide the value of the enlargement/reduction ratio K by calculating distances between the image pickup units 2 and the detection subject B2 by using the movement detection unit 14 based on the thus-obtained stereo images.

Hereinafter, specific description will be given based on FIG. 12. In FIG. 12, B indicates a distance between the centers of the image pickup lenses 2B of the two image pickup units 2. L indicates a distance between the detection subject B2 and the two image pickup units 2. To be strict, a distance between one the image pickup unit 2 and the detection subject B2 differs from a distance between the other image pickup unit 2 and the detection subject B2. However, since the value of B with respect L is remarkably small in actuality, the distances between the image pickup units 2 and the detection subject 2 are approximated to be represented by L. An optical distance between the image pickup lens 2B and the image pickup element 2A in each of the image pickup units 2 is represented by f.

When a distance between an image location of the detection subject on the image pickup element 2A in one of the image pickup units 2 and an image location of the detection subject on the image pickup element 2A in the other image pickup unit 2 is set as a disparity d, L is detected by the following equation:

$$L = B \times f/d.$$

In the case where: a disparity in a central coordinate (xc, yc) of the detection subject B2 of the standard image is represented by dc; a distance is represented by Lc; a disparity in a central coordinate (x'c, y'c) of the detection subject B2 of the reference image is represented by dc'; and a distance is represented by Lc', the enlargement/reduction ratio K is decided by the following equation in view of the fact that an image pickup size of the detection subject is inversely proportional to the distance:

$$K = Lc/Lc'.$$

Note that the enlargement/reduction ratio k is generally calculated by using a disparity directly derived from the image processing in the actual processing. That is, as described in the foregoing, since the distance and the disparity are in the inverse proportion relationship, the enlargement/reduction ratio K may be decided by the following equation:

$$K = dc'/dc.$$

In the case of detecting the disparity or the distance based on the stereo images as described above, it is necessary to associate the detection subjects included in left images of the stereo images with each other as well as to associate the detection subjects included in right images of the stereo images with each other. It is possible to perform the detection subject association in the stereo images by a method of similarity judgment in the detection subject images or the like.

(Case Wherein Detection Subject Rotates)

Shown in FIG. 13(*a*) is a state of picking up images in the case where the detection subject is a car and when the car approaches to the image pickup unit 2 while rounding a curve. Shown in FIG. 13(*b*) is a state wherein the image of 13(*a*) is displayed as a binary image. In these drawings, the images indicated by "PRE-PREVIOUS", "PREVIOUS", "CURRENT" are an image of a frame precedent to the current image by two frames, an image of a frame precedent to the current image by one frame, and an image of a current frame. As shown in FIG. 13(*b*), four corners of the car are selected as characteristic points based on the pre-previous image of the detection subject, and a correlation window is provided around each of the characteristic points.

The car travels almost straight in the pre-previous image and the previous image, and there is little change in orientation (posture) of the car from the pre-previous image to the previous image. Therefore, the pre-previous image of the detection subject and the previous image of the detection subject are substantially similar to each other. Accordingly, it is possible to associate the detection subject in the pre-previous image with the detection subject in the previous image accurately by setting a value of the enlargement/reduction ratio K by the above-described method.

In contrast, since the orientation of the car of the current image is different from that of the previous image, it is difficult to accurately perform the association simply by enlarging/reducing the distance between the correlation windows and the standard point. The reason for the difficulty is that an orientation of characteristic points with respect to a central coordinate of the detection subject of the previous image is different from that of the current image.

Accordingly, the movement detection unit 14 performs a rotation conversion indicated by the following expression on the coordinates of the characteristic points to perform the association by rotating the coordinates of the characteristic points with respect to the central coordinate of the detection subject.

[Expression 6]

In Expression 6, θ represents a rotation angle. The enlargement/reduction ratio is represented by K as in the foregoing examples. With such conversion, it is possible to deal with the change in orientation and the change in size of the detection subject in picked-up images.

(Determination of Rotation Angle)

Basically, the value of the rotation angle θ is not decided uniquely and varies largely depending on the change in orientation of the detection subject. Therefore, in actuality, the movement detection unit 14 gives several types of rotation angle θ to perform the evaluation operation, and the pixels (pixels each having an evaluated value close to 0) that achieve the best correlativity are ultimately selected for performing the movement detection. That is, in order to reduce the processing time, it is preferable to narrow down a range of values of the rotation angle θ. Therefore, as described below, in the case where it is possible to determine an orientation of a detection subject depending on a region of a picked-up image, it is possible to reduce the processing time by uniquely deciding the value of the rotation angle θ by using the orientation.

Figure 14A:
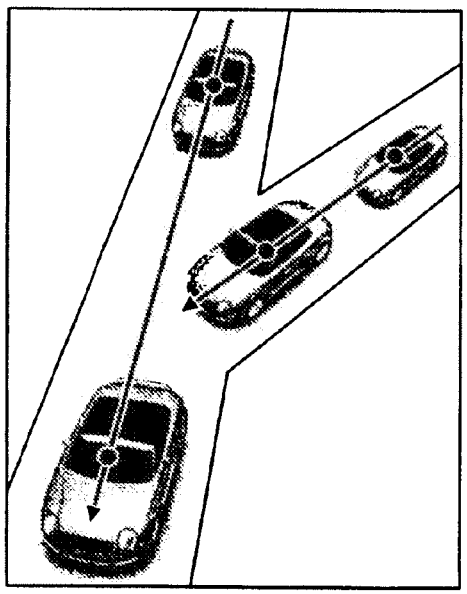
FIG. 14(a) is a diagram showing, in the case where the detection subject is a car, one example in which the car is traveling on a road having a branch point.
Figure 14B:
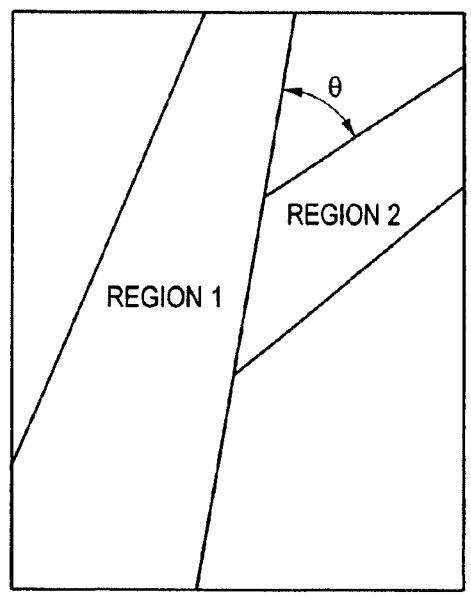
FIG. 14(b) is a diagram showing a region of the road included in the picked-up image of FIG. 14(a).

Shown in FIG. 14(*a*) is one example of the case wherein the detection subject is a car traveling on a road having a branch point. In such case, an orientation of the car is decided basically depending on a direction of the road on which the car travels.

Shown in FIG. 14(*b*) is a region of the road included in the picked-up image. As shown in FIG. 14(*b*), a region 1 which is a straight road region and a region 2 which is a straight road region exist, and it is possible to uniquely decide the orientation of the car in each of the regions. That is, when an angle formed by the direction of the road of the region 1 and the direction of the road of the region 2 is θ, the rotation conversion by Expression 6 using the determined θ is performed for association in the case where the car moves from the region 2 to the region 1.

Thus, in the case where it is possible to identify the condition related to the orientation of the detection subject by the position of the detection subject in the picked-up image, it is possible to uniquely decide the value of the rotation angle θ depending on the position to which the movement detection unit 14 applies the correlation window in the reference image by setting a rotation relationship between the regions in the picked-up image in advance of the movement detection.

(Rotation of Correlation Window)

Figure 15:
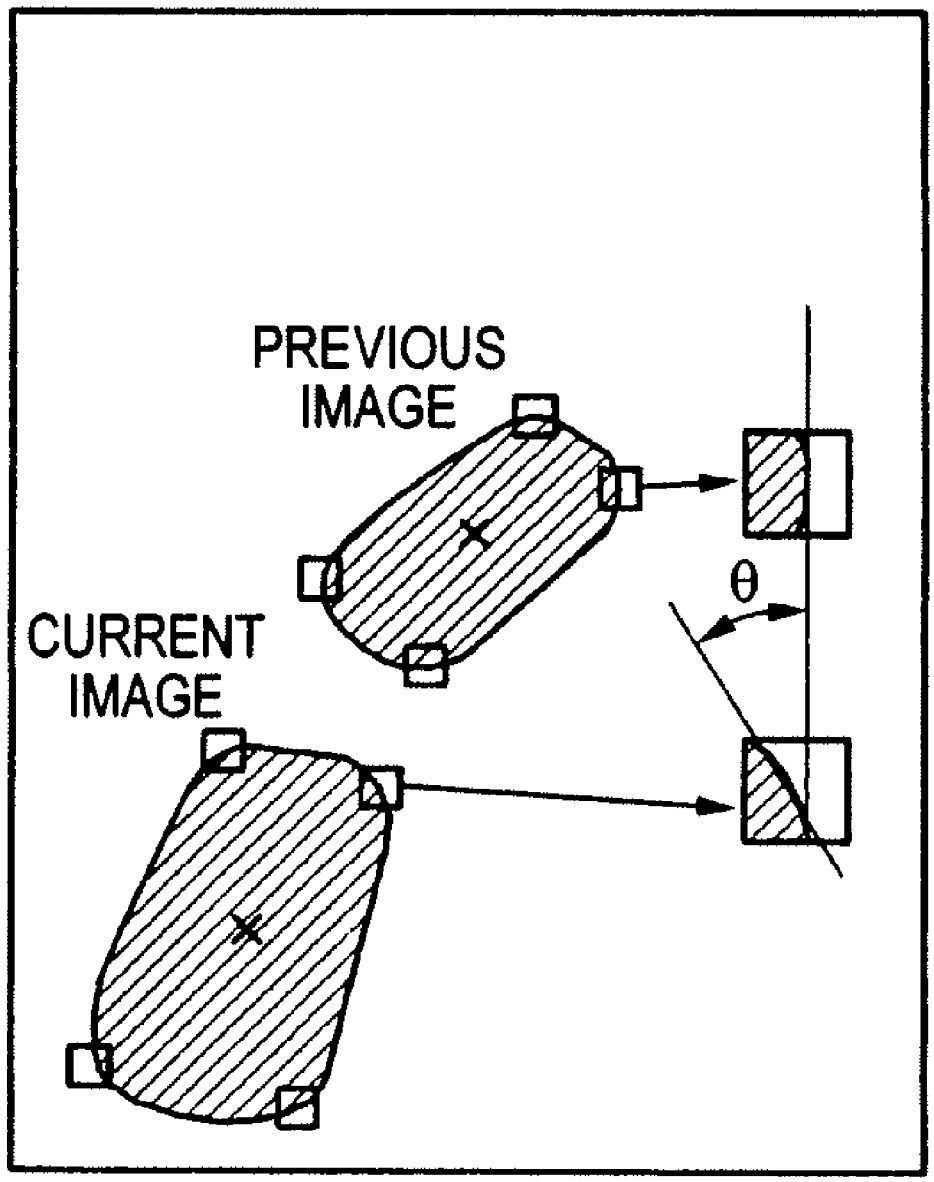
FIG. 15 is an enlarged view of one of the correlation windows in the previous and current images of the detection subject shown in FIG. 13(*b*).
Figure 16D:
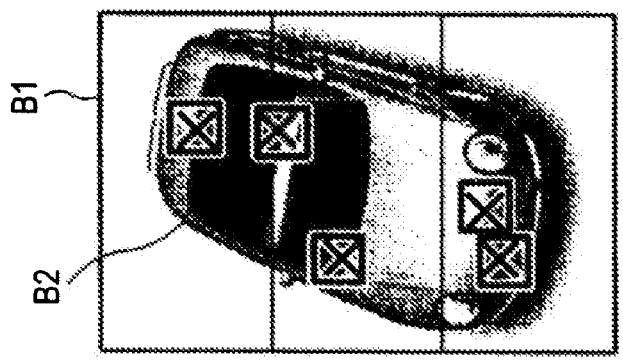
FIGS. 16(*a*) to (*d*) are diagrams showing a process of selecting characteristic points and setting correlation windows in the case where a car is picked up as the detection subject.
Figure 16C:
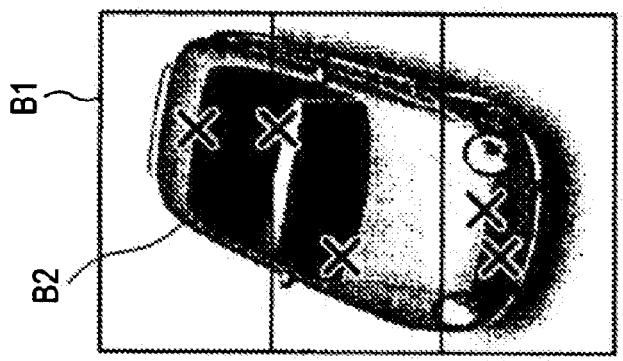
Figure 16B:
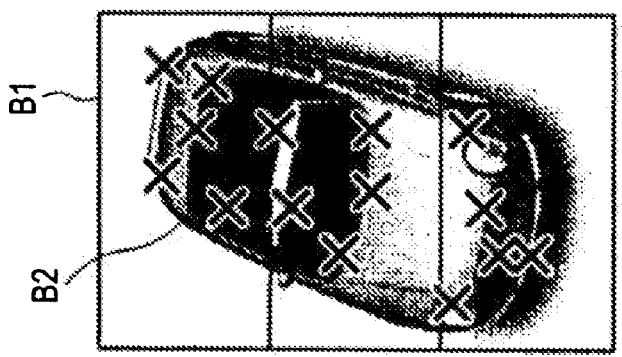
Figure 16A:
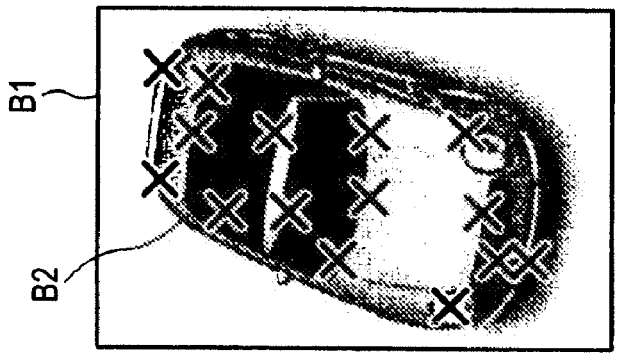

Shown in FIG. 15 is an enlarged view of one correlation window in the previous and current images of the detection subject shown in FIG. 13(*b*). As shown in FIG. 15, when the orientation of the detection subject changes, an orientation of the image of the correlation window changes. Accordingly, influence exerted on an evaluated value to be obtained by the evaluation function is increased with an increase in angle change in orientation of the detection subject, thereby increasing difficulty in performing association.

Therefore, in order to deal with the above case, the movement detection unit 14 not only converts the relative coordinate of the characteristic points as described above but also rotates the images in the range of the correlation windows about the central coordinate of each of the correlation windows. By performing such processing, it is possible to perform the association of the detection subject of the standard image with the detection subject in the reference image in the case where the orientation of the detection subject largely changes.

Due to the addition of the rotation conversion processing for the images in the correlation windows, the amount of operation is more or less increased. However, since the number of pixels of the images in the correlation windows is small, the processing time is not increased prominently.

(Specific Examples of Setting Characteristic Points and Correlation Windows)

Hereinafter, description will be given on specific examples of the processing for extracting the characteristic points and the processing for setting correlation windows that are performed by the correlation window setting unit 13 as described in the foregoing with reference to FIGS. 6(*a*) to 6(*d*). Shown in FIG. 16(*a*) is one example of the detection subject region B1 including the detection subject region B2 in a state where a car is picked up as the detection subject B2. When the filtering processing is performed on the detection subject region B1 by using the filters shown in FIG. 17, plural pixels achieving filtering result values that are less than a predetermined threshold value are selected. In FIG. 16(*a*), pixels indicated by x are the selected pixels. A contrast between the thus-obtained selected points and the surrounding pixels is relatively high.

Figure 17:
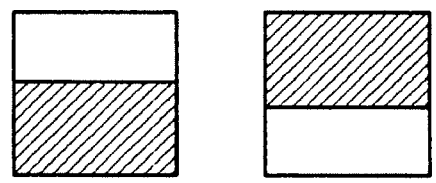
FIG. 17 is a diagram showing filters applied to the image shown in FIG. 16(*a*).

Though the filters shown in FIG. 17 are those that detect an edge in a horizontal direction, it is preferable to appropriately set an optimum filter depending on the orientation of image pickup of the detection subject, the shape of the detection subject, and the like.

After that, the detection subject region B1 is divided into plural partial regions (intermediate regions) as shown in FIG. 16(*b*). Selection points having a high contrast are selected one by one sequentially from the partial regions, and the selection of the selected points from the partial regions is repeated until the number of the selected points reaches to a predetermined value, thereby setting the characteristic points (FIG. 16(*c*)). When the characteristic points are selected as described above, the characteristic points are selected evenly from the partial regions. By selecting the characteristic points evenly from the partial regions, it is possible to perform the association based on the entire shape of the detection subject B2. After that, a correlation window is set around each of the selected characteristic points as shown in FIG. 16(*d*).

Figure 18:
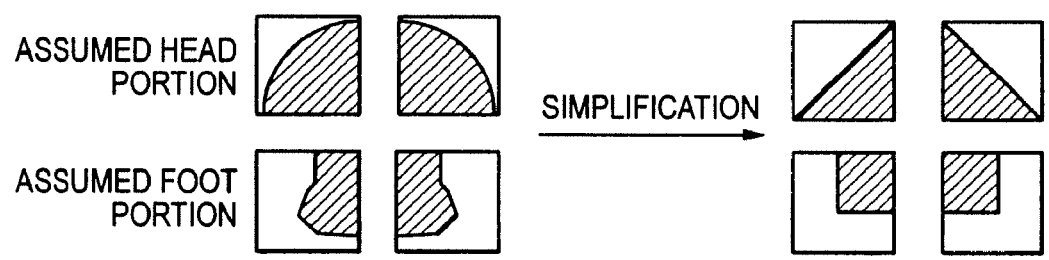
FIG. 18 is a diagram showing one example of filter to be used for the case of detecting a movement of a person as a detection subject.

In the case of detecting a movement of a person as a detection subject, filters shown in FIG. 18 may be used. In this case, it is assumed that a heat portion and a foot portion of a person as the detection subject are included in the picked-up image. Among four filters shown in the left hand side of FIG. 18, upper two filters are filters for detecting an upper left an upper right of the head portion, and lower two filters are filters for detecting a lower left and a lower right of the foot portion. The filters may be used as they are, and images of the filters may be simplified depending on the sizes of the correlation windows as shown on the right hand side of FIG. 18.

Figure 19:
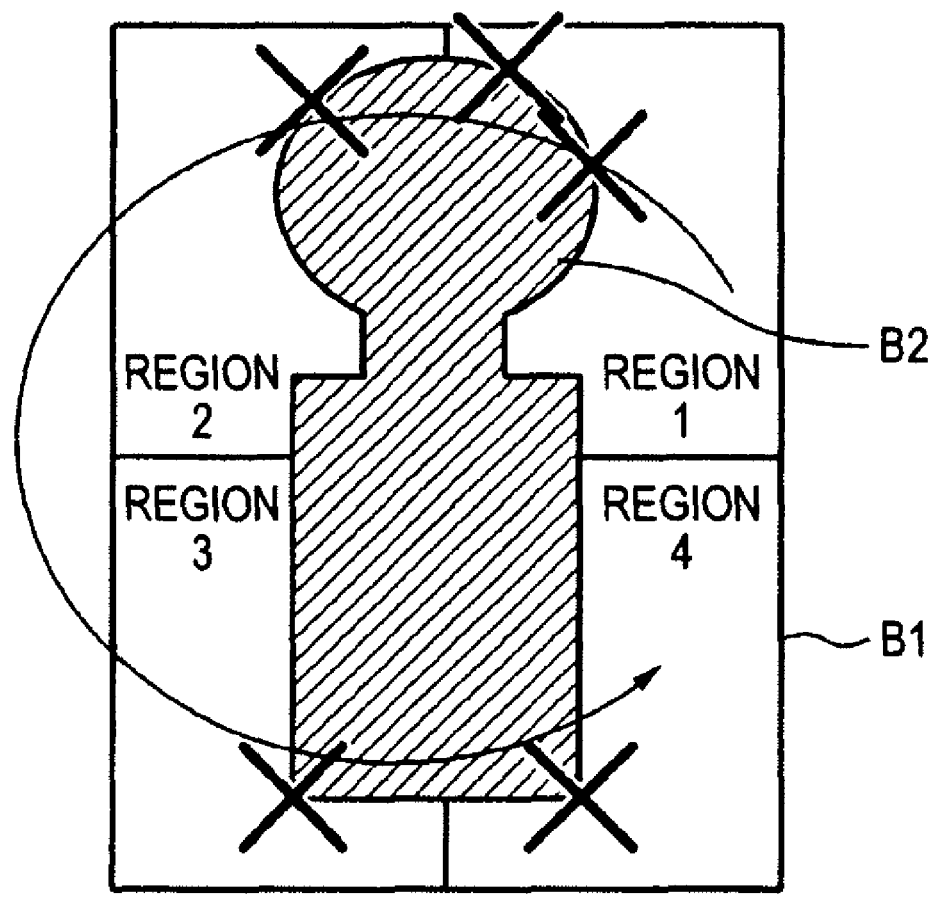
FIG. 19 is a diagram showing a process for selecting the characteristic points in the case of detecting a movement of a person as a detection subject.

When the filtering processing is performed by using the above filters for the detection subject region B1, plural pixels each achieving a filtering result lower than the threshold value are selected. As shown in FIG. 19, the detection subject region B1 is divided into plural partial regions. In the same manner as described above, a selected point having a high contrast is selected from each of the partial regions sequentially, and the selection of the selected points from the partial regions is repeated until the number of the selected points reaches to a predetermined value to select the characteristic points.

(Another Example of Flow of Movement Detection Processing)

Figure 4:
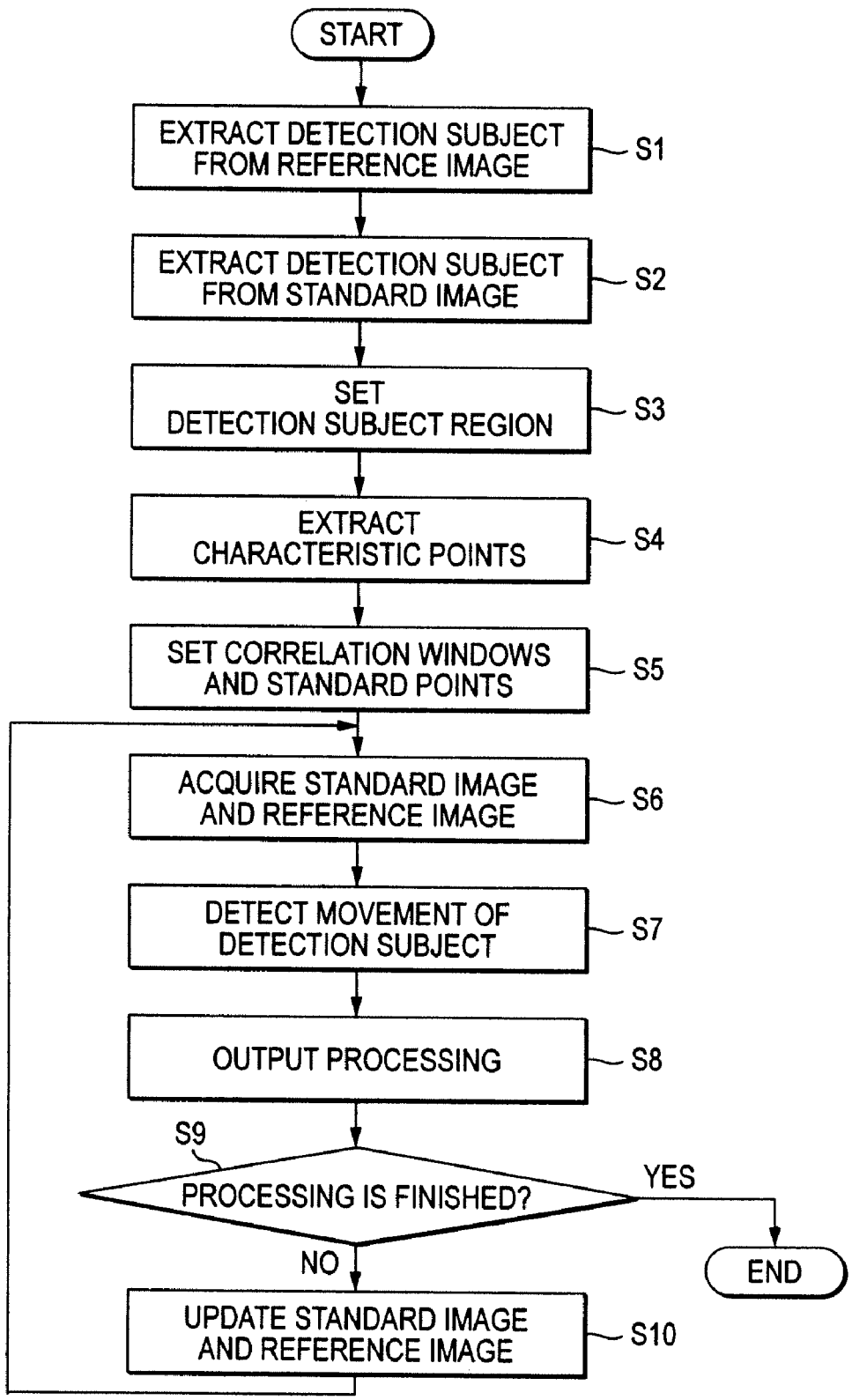
FIG. 4 is a flowchart showing a flow of a movement detection processing.
Figure 20:
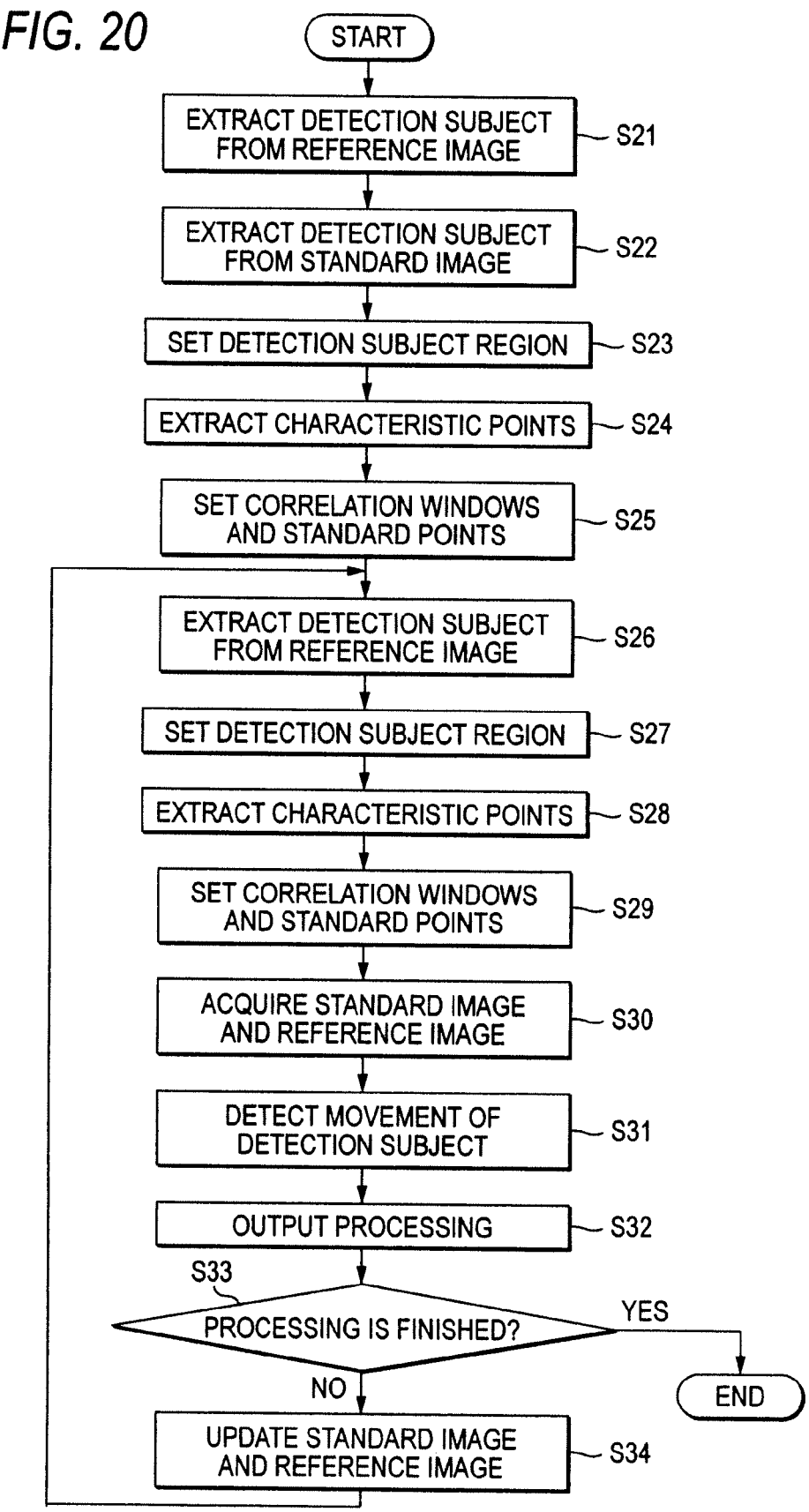
FIG. 20 is a flowchart showing another example of flow of the movement detection processing.

In the flowchart of the movement detection processing shown in FIG. 4, steps similar to the steps from S2 to S5 may be performed on the reference image after S6. FIG. 20 is a flowchart showing a flow of movement detection processing in such case. Since steps of S21 to S25 are the same as those of S1 to S5 in FIG. 4, description for S21 to S25 is omitted.

In S26, the detection subject region setting unit 12 obtains image data of the reference image corresponding to the next frame of the standard image from the image storage unit 21 and extracts at least one detection subject from the reference image in the same manner as in the processing in S2. After that, in the same manner as in the processing of S3 to S5, processing of S27 to S29 is performed. That is, the detection subject region setting unit 12 sets the detection subject region in S27, the correlation window setting unit 13 extracts plural characteristic points in S28, and the correlation window setting unit 13 sets correlation windows and a standard point in S29.

After that, the movement detection unit 14 obtains image data of the standard image and image data of the reference image corresponding to the next frame of the standard image from the image storage unit 21 (S30). After that, the movement detection unit 14 performs the evaluation operation using the correlation windows and the standard point set in S25 to detect a movement of the detection subject by determining a corresponding point with which the evaluated value is minimized and smaller than a predetermined threshold value on the reference image (S31). What is different from the processing of S7 is that the search range for searching the corresponding point in the reference image is changed to the standard point set in S29. That is, the movement of the detection subject is detected by determining the detection subject that is judged to be identical with the detection subject determined in the standard image among the detection subjects determined in the reference image. The subsequent processing of S32 to S34 is the same as the processing of S8 to S10 in FIG. 4.

The above-described processing is suitable for traffic surveillance and passerby surveillance wherein many detection subjects move in and out an image pickup range. In this case, a multiple of detection subjects are extracted from the standard image (N detection subjects from B1 to BN, for example), and correlation windows and a standard point are set for each of the detection subjects in S22. Also, M detection subjects (B'1 to B'M) are extracted from the reference image, and correlation windows and a standard point are set for each of the detection subjects in S26.

After that, in S31, the standard points (xmc', ymc') (m=1 to M) of the detection subjects B'1 to B'M on the reference image are assigned to Expression 2 for the standard points (xnc, ync) (n=1 to N) of the detection subjects B1 to BN on the standard image, and a pair achieving a smallest evaluated value E which is smaller than a predetermined threshold value is associated to each other as an identical object.

In the case where it is impossible to associate any of the detection subjects B1 to BN, such detection subject is treated as having been exited from the image pickup range. In the case where it is impossible to associate any of the detection subjects B'1 to B'M, such detection subject is treated as having been entered into the image pickup range.

That is, according to the above-described processing, it is possible to track an object that does not exist in the standard image but exists only in the reference image.

Also, according to the above-described processing, since the search for the corresponding points is limited to the standard points of the detection subjects determined in the reference image, it is possible to perform the movement detection at high speed and with accuracy as compared to the case of searching the entire points in the reference image.

Figure 21A:
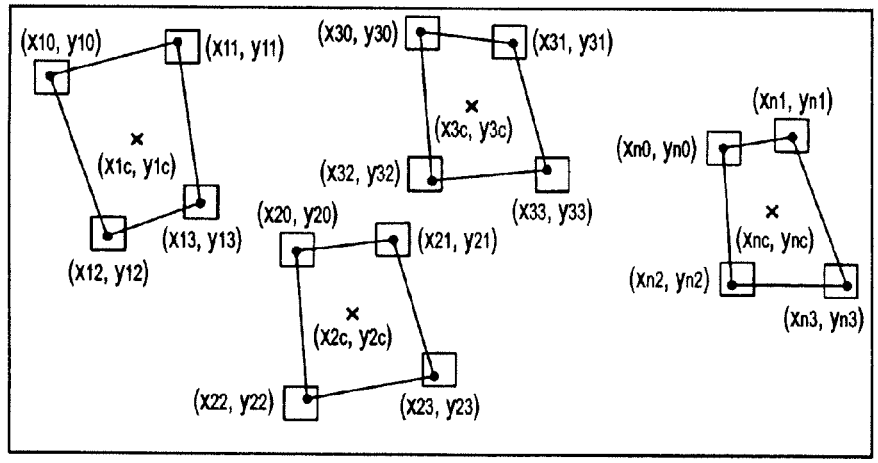
FIGS. 21(*a*) to 21(*c*) are diagrams showing examples of standard image, reference image, and movement tracking display image in the case where plural detection subjects exist in each of the images.
Figure 21B:
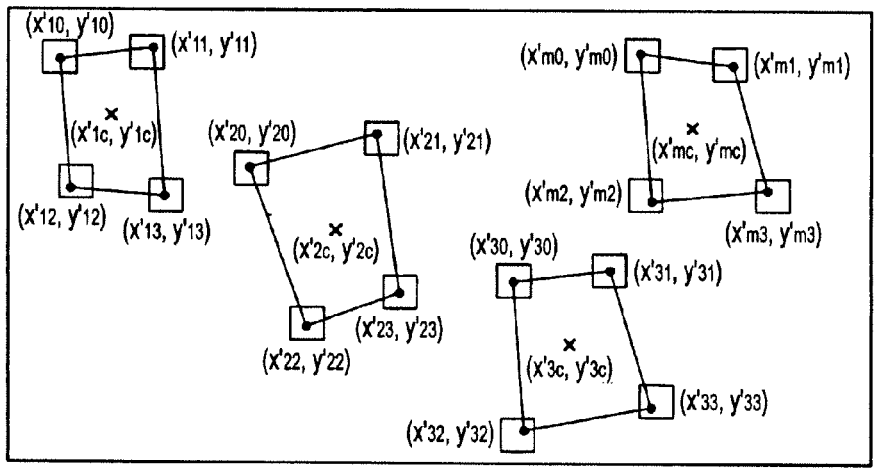
Figure 21C:
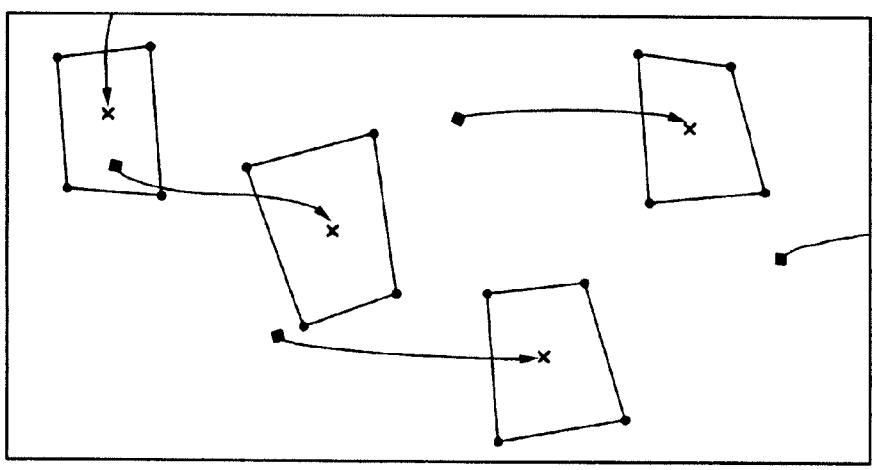

In the case where the detection subjects are detected in the standard image as shown in FIG. 21(a) and the detection subjects are detected in the reference image as shown in FIG. 21(b), movement tracking for each of the detection subjects is realized as shown in FIG. 21(c) according to the above-described processing.

(Flow of Movement Detection Processing when Using Stereo Images)

Hereinafter, a flow of movement detection processing in a structure of determining an enlargement/reduction ratio by stereo images will be described. In the case of determining the enlargement/reduction ratio by stereo images, it is necessary to calculate a disparity (distance) of each of the standard points of the detection subjects in both of the standard image and the reference image. Therefore, as in the processing of the flowchart shown in FIG. 20 described above, it is necessary to determine the detection subjects in both of the standard image and the reference image. Also, the determination of detection subject is performed for each of the stereo images of the standard image and the reference image.

Specifically, the following processing is performed. In S31 of FIG. 20, the movement detection unit 14 calculates disparities $d1c$ to $dNc$ (or distances $L1c$ to $LNc$) by the above-described method for the standard points (xnc, ync) (n=1 to N) of the detection subjects B1 to BN in the standard image. Also, in the same manner, the movement detection unit 14 calculates disparities $d1c'$ to $dMc'$ (or distances $L1c'$ to $LNc'$) by the above-described method for the standard points (xmc', ymc') (m=1 to M) of the detection subjects B'1 to B'M in the reference image.

Next, the movement detection units 14 calculates an enlargement/reduction ratio K by the above-described expression for the combinations of the standard points in the standard image and the standard points in the reference image by setting K=dmc'/dnc (or K=Lnc/Lmc'). After that, the movement detection unit 14 assigns the enlargement/reduction ratio K to the above-described expression of (xci, yci)=K (xci, yci) to convert a relative coordinate and detects an evaluated value by using the evaluation function shown in Expression 2. As described above, the combination of the standard point and the corresponding point that achieves the smallest whose evaluated value E is the smallest (and not more than a predetermined threshold value) is associated to each other as an identical object to detect the movement of the object.

According to the above processing, since the enlargement/reduction ratio K is narrowed down to a certain degree, it is possible to reduce the processing time.

(Specific Structure of Image Processing Apparatus)

The blocks provided in the image processing unit 3, particularly, the picked-up image storage control unit 11, the detection subject region setting unit 12, the correlation window setting unit 13, the movement detection unit 14, and the output control unit 15 may be structured by a hardware logic or may be realized by software by using a CPU.

That is, the image processing unit 3 is provided with a CPU (central processing unit) for executing instructions of a control program realizing the functions, a ROM (read only memory) storing the program, and a RAM (random access memory) developing the program, a memory device (recording medium) such as a memory for storing the program and various data, and the like. The object of this invention is also attained by supplying the recording medium recording program cords (an execution format program, an intermediate cord program, a source program) of the control program which is the software realizing the functions of the image processing unit 3 in such a fashion that a computer can read and by causing the computer (CPU or MPU) to read out and execute the program cords recorded on the recording medium.

Usable as the recording medium are tapes such as a magnetic tape and a cassette tape; disks including magnetic disks such as a floppy disk (trade name) and a hard disk and optical disks such as a C-ROM, an MO, an MD, a DVD, and a CD-R; cards such as an IC card (including memory card) and an optical card; semiconductor memories such as a mask ROM, an EPROM, an EEPROM, and a flash ROM; and the like.

Also, the image processing unit 3 may have a structure that is capable of accessing a communication network so that the program code is supplied via the communication network. The communication network is not particularly limited, and usable communication networks are the internet, an intranet, an extranet, a LAN, an ISDN, a VAN, a CATV communication network, a virtual private network, a telephone line network, a mobile communication network, a satellite communication network, and the like. Also, a transmission medium for structuring the communication network is not particularly limited, and wired transmission such as IEEE1394, an USB, a electric power line carrier, a cable TV line, a telephone line, and an ADSL line and a wireless transmission such as an infrared ray including IrDA and a remote controller, the Bluetooth (trade name), 802.11 wireless communication, HDR, a mobile phone network, a satellite circuit, and a ground wave digital network are usable. This invention can be realized in an embodiment of computer data signals embedded in a carrier wave, which is an embodiment of the program code by an electronic transmission.

This invention is not limited to the embodiments described above, and it is possible to make various alterations in the scope of claims. That is, embodiments obtained by combining technical means that are appropriately altered within the scope of claims are encompassed by the technical scope of this invention.

INDUSTRIAL APPLICABILITY

It is possible to use the moving object tracking system according to this invention for traffic control, vehicle travel assistance, and the like by determining movements of vehicles. Also, it is possible to use the moving object tracking system for passersby status investigation, customer behavior investigation, and the like by determining movements of passersby in public areas and movements of customers and the like in retail premises. Also, the moving object tracking system is usable for production control, production planning, and the like by determining movements of production subject in a production line in a plant and movements of workers.

What is claimed is:
1. An image processing apparatus comprising:
a CPU configured to:
obtain an acquired image at a first time point as a standard image from time-series acquired image data obtained by an image acquisition unit acquiring a tracking subject and select a plurality of partial image regions including an image region of the tracking subject in the standard image, each of the plurality of partial image regions being separately spaced from the other of the plurality of partial image regions;
obtain an acquired image at a second time point that is different from the first time point as a reference image and detect a movement of the tracking subject between the standard image and the reference image based on a difference between a state of pixel values of the partial image regions of the standard image and a state of pixel values of partial image regions of the reference image;
set a center of each of the plurality of partial image regions as a standard point used as a standard for relative positions of the partial image regions; and
obtain the state of the pixel values of the partial image regions of the reference image with the relative positions being unchanged, the relative positions being the relative positions of the partial image regions with respect to the standard point, and calculate the difference between the obtained state of the pixel values of the partial image regions and the state of the pixel values of the partial image regions of the standard image to calculate a position of the standard point in the reference image.

2. The image processing apparatus according to claim 1, wherein a total of numbers of pixels in the plural partial image regions is smaller than the number of pixels of the image region of the tracking subject.

3. The image processing apparatus according to claim 1, wherein the is further configured to divide the image region of the tracking subject into a plurality of intermediate regions to select at least one of the intermediate regions as the partial image region.

4. The image processing apparatus according to claim 1, wherein the CPU is further configured to select a plurality of characteristic points by applying a filter for detecting the characteristic points characterizing a partial shape of the tracking subject to the standard image to set a region including the characteristic points as the partial image region.

5. A moving object detection system comprising:
an image acquisition unit for acquiring a tracking subject and
the image processing apparatus defined in claim 1.

6. An image processing apparatus comprising:
a CPU configured to:
obtain an acquired image at a first time point as a standard image from time-series acquired image data obtained by an image acquisition unit acquiring a tracking subject and select a plurality of partial image regions including an image region of the tracking subject in the standard image, each of the plurality of partial image regions being separately spaced from the other of the plurality of partial image regions;
obtain an acquired image at a second time point that is different from the first time point as a reference image and detect a movement of the tracking subject between the standard image and the reference image based on a difference between a state of pixel values of the partial image regions of the standard image and a state of pixel values of partial image regions of the reference image;
set a center of each of the plurality of partial image regions as a standard point used as a standard for relative positions of the partial image regions, the relative positions of the partial image regions of the standard image being identical to respective of the relative positions of the partial image regions of the reference image; and
obtain the state of the pixel values of the partial image regions of the reference image by converting the relative positions of the partial image regions with respect to the standard point by a predetermined conversion processing and calculate a position of the standard point in the reference image by calculating the difference between the obtained state of the pixel values of the partial image regions and the state of the pixel values of the partial image regions of the standard image.

7. The image processing apparatus according to claim 6, wherein the CPU is further configured to perform a processing of enlarging or reducing a distance between each of the relative positions of the partial image regions and the standard point as the predetermined conversion processing.

8. The image processing apparatus according to claim 7, wherein the CPU is further configured to decide an enlargement/reduction ratio based on a position of the detection subject in the standard image and a position of the tracking subject in the reference image.

9. The image processing apparatus according to claim 7, wherein the CPU is further configured to obtain from the image acquisition unit two acquired images obtained by acquiring the tracking subject from two different points simultaneously and calculate a distance between the tracking subject and the image acquisition unit in the standard image and a distance between the tracking subject and the image acquisition unit in the reference image based on the two acquired images to decide the enlargement/reduction ratio based on the distances.

10. The image processing apparatus according to claim 6, wherein the CPU is further configured to perform as the predetermined conversion processing a processing of rotating the relative positions of the partial image regions, which are relative to the standard point.

11. The image processing apparatus according to claim 10, wherein the CPU is further configured to decide a rotation angle based on the position of the tracking subject in the standard image and the position of the tracking subject in the reference image.

12. The image processing apparatus according to claim 10, wherein the CPU is further configured to obtain the state of the pixel values of the partial image regions by rotating the partial image regions of the reference image.

13. An image processing method comprising:
obtaining, via a processor, an acquired image at a first time point as a standard image from time-series acquired image data obtained by an image acquisition unit acquiring a tracking subject and selecting a plurality of partial image regions including an image region of the tracking subject in the standard image, each of the plurality of partial image regions being separately spaced from the other of the plurality of partial image regions;
obtaining, via the processor, an acquired image at a second time point that is different from the first time point as a reference image and detecting a movement of the tracking subject between the standard image and the reference image based on a difference between a state of pixel values of the partial image regions of the standard image and a state of pixel values of partial image regions of the reference image;
setting, via the processor, a center of each of the plurality of partial image regions as a standard point used as a standard for relative positions of the partial image regions; and
obtaining, via the processor, the state of the pixel values of the partial image regions of the reference image with the relative positions being unchanged, the relative positions being the relative positions of the partial image regions with respect to the standard point, to calculate the difference between the obtained state of the pixel values of the partial image regions and the state of the pixel values of the partial image regions of the standard image.

14. An image processing method comprising:
obtaining, via a processor, an acquired image at a first time point as a standard image from time-series acquired image data obtained by an image acquisition unit acquiring a tracking subject and selecting a plurality of partial image regions including an image region of the tracking subject in the standard image, each of the plurality of partial image regions being separately spaced from the other of the plurality of partial image regions, and
obtaining, via a processor, an acquired image at a second time point that is different from the first time point as a reference image and detecting a movement of the tracking subject between the standard image and the reference image based on a difference between a state of pixel values of the partial image regions of the standard image and a state of pixel values of partial image regions of the reference image;
setting, via the processor, a center of each of the plurality of partial image regions as a standard point used as a standard for relative positions of the partial image regions, the relative positions of the partial image regions of the standard image being identical to respective of the relative positions of the partial image regions of the reference image; and
obtaining, via the processor, the state of the pixel values of the partial image regions of the reference image by converting the relative positions of the partial image regions with respect to the standard point by a predetermined conversion processing to calculate a position of the standard point in the reference image by calculating the difference between the obtained state of the pixel values of the partial image regions and the state of the pixel values of the partial image regions of the standard image.

15. A non-transitory recording medium storing an image processing program, the program, when executed by a computer causing the computer to perform the steps of:
obtaining an acquired image at a first time point as a standard image from time-series acquired image data obtained by an image acquisition unit acquiring a tracking subject and selecting a plurality of partial image regions including an image region of the tracking subject in the standard image, each of the plurality of partial image regions being separately spaced from the other of the plurality of partial image regions;
obtaining an acquired image at a second time point that is different from the first time point as a reference image and detecting a movement of the tracking subject between the standard image and the reference image based on a difference between a state of pixel values of the partial image regions of the standard image and a state of pixel values of partial image regions of the reference image;
setting a center of each of the plurality of partial image regions as a standard point used as a standard for relative positions of the partial image regions; and
obtaining the state of the pixel values of the partial image regions of the reference image with the relative positions being unchanged, the relative positions being the relative positions of the partial image regions with respect to the standard point, to calculate the difference between the obtained state of the pixel values of the partial image regions and the state of the pixel values of the partial image regions of the standard image.

* * * * *